(12) United States Patent
Howe

(10) Patent No.: US 8,568,002 B2
(45) Date of Patent: Oct. 29, 2013

(54) LIGHT DIFFUSION AND CONDENSING FIXTURE

(75) Inventor: Leslie D. Howe, Atlanta, GA (US)

(73) Assignee: Southpac Trust International Inc., Trustee of the LDH Trust, Rarotonga (CK)

(*) Notice: Subject to any disclaimer, the term of this patent is extended or adjusted under 35 U.S.C. 154(b) by 291 days.

(21) Appl. No.: 12/952,765

(22) Filed: Nov. 23, 2010

(65) Prior Publication Data

US 2011/0216521 A1    Sep. 8, 2011

Related U.S. Application Data

(60) Provisional application No. 61/311,104, filed on Mar. 5, 2010.

(51) Int. Cl.
*F21V 17/06*    (2006.01)
(52) U.S. Cl.
USPC .......... 362/433; 362/97.4; 362/330; 362/632; 362/633; 362/634
(58) Field of Classification Search
USPC ......... 362/34, 97.1–97.4, 294, 328, 330, 433, 362/444, 455, 632–634
See application file for complete search history.

(56) References Cited

U.S. PATENT DOCUMENTS

| | | | |
|---|---|---|---|
| 4,052,607 A | 10/1977 | Larson | |
| 4,446,506 A | 5/1984 | Larson | |
| 4,504,888 A | 3/1985 | Rosenthal | |
| 4,594,645 A | 6/1986 | Terashita et al. | |
| 4,616,293 A | 10/1986 | Baliozian | |
| 4,633,374 A | 12/1986 | Waltz et al. | |
| 4,669,031 A | 5/1987 | Regester | |
| 4,757,425 A | 7/1988 | Waltz | |

(Continued)

FOREIGN PATENT DOCUMENTS

| | | |
|---|---|---|
| JP | 2008197166 | 8/2008 |
| KR | 1020070038832 | 4/2007 |

OTHER PUBLICATIONS

PCT/US2011/027280 International Preliminary Report on Patentability.

(Continued)

*Primary Examiner* — Diane Lee
*Assistant Examiner* — Meghan Dunwiddie
(74) *Attorney, Agent, or Firm* — Troutman Sanders LLP; Mark L. Jones; James E. Schutz

(57) ABSTRACT

Certain embodiments of the invention may include system apparatus for providing a light diffusion and condensing fixture. According to an example embodiment, a light fixture is configured for illuminating subjects and it includes an enclosure cavity. The enclosure defines a cavity with an opening and one or more reflective inner surfaces. The light fixture also includes a frame structure defining an optical aperture and the frame structure is disposed proximate to the opening. The light fixture also includes two or more film tensioners associated with the frame structure. The light fixture also includes at least one light source positioned between the one or more reflective surface and a plane defined by the optical aperture. The light fixture further includes at least one optical film comprising at least one lenticular lens surface and the at least one optical film is suspended substantially parallel to the optical aperture by the two or more tensioners.

31 Claims, 19 Drawing Sheets

(56) References Cited

U.S. PATENT DOCUMENTS

| | | | |
|---|---|---|---|
| 4,782,428 A | 11/1988 | Lowell et al. |
| 4,791,540 A | 12/1988 | Dryer et al. |
| 4,807,089 A | 2/1989 | Niissil |
| 4,874,228 A | 10/1989 | Aho et al. |
| 5,023,756 A | 6/1991 | Regester |
| 5,055,976 A | 10/1991 | Arai |
| 5,115,384 A | 5/1992 | Loth et al. |
| 5,132,885 A | 7/1992 | Hocheim |
| 5,154,503 A | 10/1992 | Sternsher |
| 5,224,770 A | 7/1993 | Simmons et al. |
| 5,235,497 A | 8/1993 | Costa |
| 5,295,221 A | 3/1994 | Roslan |
| 5,483,424 A | 1/1996 | Lightbody |
| 5,556,186 A | 9/1996 | Pilby |
| 5,651,602 A | 7/1997 | Tawil et al. |
| 5,841,146 A | 11/1998 | Briese |
| 5,890,793 A | 4/1999 | Stephens |
| 6,030,087 A | 2/2000 | Whittle |
| 6,109,757 A | 8/2000 | Stephens |
| 6,176,598 B1 | 1/2001 | Selligman et al. |
| 6,422,709 B1 | 7/2002 | Panagiotou |
| 6,513,955 B1 | 2/2003 | Waltz |
| 6,709,121 B1 | 3/2004 | Lowe et al. |
| 6,893,135 B2 | 5/2005 | Wright et al. |
| 7,077,534 B2 | 7/2006 | Harlocker |
| 7,164,836 B2 | 1/2007 | Wright et al. |
| 7,229,180 B2 | 6/2007 | Prtmann |
| 7,234,843 B2 | 6/2007 | Regester et al. |
| 7,246,925 B2 | 7/2007 | Waltz et al. |
| 7,470,044 B2 | 12/2008 | Maes |
| 7,597,461 B2 | 10/2009 | Laney et al. |
| 2002/0001866 A1* | 1/2002 | Kido et al. | 438/30 |
| 2006/0171164 A1 | 8/2006 | Kida |
| 2008/0136994 A1 | 6/2008 | Lee |
| 2009/0103328 A1* | 4/2009 | Iwasaki | 362/617 |
| 2009/0161345 A1 | 6/2009 | Hsu |
| 2009/0201441 A1 | 8/2009 | Laney et al. |

OTHER PUBLICATIONS

PCT/US2011/027322 International Preliminary Report on Patentability.
International Search Report for PCT/US2011/027280 mailed Oct. 18, 2011.

* cited by examiner

LIGHT DIFFUSION AND CONDENSING FIXTURE

RELATED APPLICATIONS

This application claims the benefit of provisional patent application Ser. No. 61/311,104, filed Mar. 5, 2010, the contents of which are incorporated herein by reference in its entirety, as if set forth in full.

FIELD OF THE INVENTION

This invention generally relates to lighting fixtures, and in particular to light diffusion and condensing fixtures.

BACKGROUND OF THE INVENTION

Illumination devices are often utilized for lighting subject matter in television broadcasting and/or for recording on film, video, digital storage, cinema, video, photography etc. Such illumination devices will herein be referred to as "studio lighting" sources. Studio lighting sources may be divided into two general categories: (1) hard and (2) soft. Hard lighting usually is associated with undiffused, direct light (for example, from a lamp in a light fixture) which may act as a point source of light, where the light rays striking the intended subject predominantly come from a single direction and cause pronounced shadows, highlights and contrast. Soft lighting usually refers to diffused light source that appears to "wrap" around objects, casting shadows with soft edges, and lowering the contrast and highlights. Light rays from a lamp or reflector may be softened when they pass through diffusive material and/or undergoing multiple reflections within the diffusive material. By directing the light rays to spread out in many directions, the diffusive material may subsequently act to create multiple point sources, or effectively extend the area of the source such that light rays are incident on the intended subject from a greater number of angles, producing less shadows, highlights and contrast. It is this second category of soft light sources that the present disclosure relates to.

An important consideration in studio lighting is the ability to control the type and placement of the light fixture so that the output properly lights the scene. For example, a scene on a movie set may require lighting subjects such as people, objects, areas, etc. and each of the subjects may have their own respective lighting requirements. Certain lighting situations may require "fill" lighting where one or more light fixtures with broad light dispersion patterns illuminate the entire location area. However, there are proportionally more situations that require the light to be directed towards specific subjects, and not to "spill" onto unwanted areas. Examples of light fixtures used for this purpose include fixtures that use parabolic reflectors, light grids, or louvers that partially collimate the light, and attachments such as "barn door" flaps that can control the light spillage from the fixture.

Generally, soft lighting devices fall into two general categories: (a) soft studio light sources and (b) traditional softboxes. The first category (soft studio light sources) includes light fixtures in which the output light is directed through a diffusive translucent material before reaching the subject. Such fixtures generally include an open face enclosure with a lamp disposed in front of some type of rear reflector and a diffusive material mounted in some manner on the fixture's front frame. This type of soft studio light source can suffer from a number of drawbacks, including but not limited to:

a) The fixtures are generally designed to function as partial light collimators, and not as dedicated diffusion boxes. For example, the fixtures typically have curved mirrored or metallic reflectors disposed behind the light source as a means to collimate or condense the illumination pattern to some degree. The diffusive material may be mounted in some fashion on the front face of the light fixture directly on the front of the light source. For example, a gel frame may slide into tracks disposed on the front face of the fixture. Due to the close proximity of the diffusion material to the partially collimated light source and the lack of light scattering within the fixture, the output luminance across the diffusion material may be non uniform, and may exhibit distinct "hot spots" in the areas directly in front of the lamps, and may result in an uneven illumination pattern.

b) The backscatter of light reflecting from the back side of the diffusion material may be lost or absorbed either through the space between the diffusion material and frame of the fixture or from absorption losses within the enclosure. Such absorption or misdirection of the light can reduce the efficiency of the fixture.

c) The light output from the diffusion material may exhibit a very wide dispersion pattern. In order to narrow this dispersion pattern as required for a particular lighting setup, light blocking or honeycomb grids may typically be placed in front of or behind the diffusion material, and narrow the beam by blocking, absorbing, or reflecting light rays that fall outside a desired coverage angle. Light energy absorbed by the grids may therefore, wasted. The deeper and the narrower the grid channels, the narrower the beam and the greater the light loss. By this very nature, grids are a very inefficient means for controlling the direction of light, and they incur large losses of light intensity.

d) Light fixtures that utilize linear fluorescent lamps typically have reflectors disposed directly behind the lamps and such reflectors have a degree of curvature to collimate the reflected light to some extent. This curvature, necessitated by the linear geometry of the fluorescent lamp, is generally in a single direction following the major axis of the lamp. Accordingly, the dispersion pattern of the light will only be condensed in a plane perpendicular to the major axis of the lamps. For example, if the lamps are disposed in a horizontal direction, the light output pattern will be condensed in the vertical direction.

e) Light fixtures typically have fixed reflectors that collimate the light to a predetermined viewing angle. Changing this viewing angle may necessitate the use of diffusion material to spread the pattern, or grids or louvers to collimate the light further.

f) Light fixtures with "hot" lights such as sodium, tungsten, hydrargyrum medium-arc iodide (HMI) etc, typically use rear parabolic reflectors; however, such fixtures are very bulky and large. Generally, the more efficient the reflector, the more parabolic in shape it will be, with a corresponding increase in depth of the reflector and light fixture.

g) A typical studio light with fluorescent lamps relies on ventilation through the front face of the unit. Such fixtures typically utilize a gel frame for attaching the diffusion material. The gel frame usually slides or clips onto suitable holders on the front frame of the unit. Subsequently, inadequate space is sometimes left between the face of the unit and the light modifying films, restricting air flow around the lamps. Such restriction of air flow can reduce life expectancy and can cause the high output lamps to increase their operating temperature, which can increase the color temperature and the green spectrum of the light output.

The second category of soft lighting devices (as referred-to above) are diffusion enclosures or "traditional softboxes." A traditional softbox, as illustrated in FIG. 7a, is an enclosure with a generally parabolic shape, a light source disposed therein, reflective walls, an optional translucent diffusing sheet (typically white nylon fabric) suspended midway in the softbox for extra light reflection and diffusion, and a layer of the same diffusion material at the light output end of the enclosure. The enclosure is usually formed by stretching a vinyl or nylon fabric over a heavy wire frame. Inside the softbox, the walls are typically lined with a reflective material such as an aluminized fabric, foil, or white vinyl. There are numerous permutations of this basic design, but most all have walls designed to act as basic reflectors that cause light output from the source lamp to undergo multiple reflections within the softbox, and to direct light rays forward towards the diffusion layer at the light output end of the softbox. These multiple reflections serve to scatter the direct light from the lamp, thus "mixing" the light within the softbox, creating a more uniform luminance output pattern. While traditional softboxes often do create an adequately diffused output surface for many applications, they suffer from a number of drawbacks, some of which are:

a) They tend to be bulky. For example, a typical 32"×44" softbox could have a depth on the order of 26" in order to achieve the required diffusion.

b) Because of their structural properties, they generally only accept a single or small grouping of point source type lamps, and are not able to accommodate linear type fluorescent lamps.

c) The light loss can be substantial due to inefficiencies in reflective materials and enclosure design. Losses can also occur when the light passing through layers of inefficient diffusive material, such as translucent nylon fabric.

d) Traditional softboxes are designed to maximize the diffusion of the light source, and therefore, the output light dispersion pattern can be extremely wide. Restricting the diffused light output pattern to a particular region within a scene has traditionally required attaching bulky and cumbersome light absorbing or blocking louvers to the face of the softbox. Such methods add additional unwanted depth to the softbox, and they usually fail to provide a substantially tight output light dispersion pattern.

e) They have no means to incorporate a ventilation system capable of adequately maintaining the internal operating temperature within acceptable limits when a sufficient number of high output, high wattage lamps are used. Therefore, temperatures can rise above optimum levels and can cause a change the color temperature or color balance of the output light, and can decrease the lamp life expectancy.

f) Attaching light modifying films to the front face is a cumbersome and time-consuming process.

There are many drawbacks associated with existing studio soft lights and traditional softbox designs. A need remains for improved systems and apparatus that can provide an improved light diffusion and condensing fixture.

BRIEF SUMMARY OF THE INVENTION

Some or all of the above needs may be addressed by certain embodiments of the invention. Certain embodiments of the invention may include systems and apparatus for a light diffusion and condensing fixture. There exists a long-felt need in the film, photography, video, television, and motion picture industries for a lighting device that can provide extremely diffused light, while simultaneously providing efficient and bright light output levels. There also exists a long-felt need for a compact and efficient lighting device that can provide diffuse light having a controlled output distribution pattern in the vertical and/or horizontal planes. There also exists a long-felt need for a lighting fixture in which bulky inconvenient, inefficient grids or louvers may be eliminated. Furthermore, there exists a long-felt need for a relatively lightweight lighting fixture that can provide cooling for lighting source elements or bulbs within the fixture, to minimize temperature-induced color change, and to maximize the usable life of the elements or bulbs.

Some or all of the aforementioned long-felt needs may be addressed by embodiments of the invention. For example, according to example embodiments, the invention may provide a fixture that is substantially thinner in profile than traditional fixtures. Example embodiments of the invention may provide higher and more efficient light output levels. According to example embodiments, the fixtures may provide a controlled output distribution pattern without the use of grids or louvers. According to an example embodiment, the invention may function as softbox using linear fluorescent tubes as the light source. According to example embodiments, the invention may provide a means for maintaining an operating temperature in which color temperature and/or color balance is maintained and bulb life expectancy is extended. Certain example embodiments may be quickly be converted to a soft light with a wide dispersion pattern suitable as a fill light.

In accordance with example embodiments of the invention, the term "subject" can include, but is not limited to people, objects, regions, etc. The subject or subjects may be illuminated for video, photography, film, motion pictures, studio sets, theater, television, internet, etc.

According to an example embodiment of the invention, a light fixture is provided. The light fixture is configured for illuminating subjects and it includes an enclosure cavity. The enclosure defines a cavity with an opening and one or more reflective inner surfaces. The light fixture also includes a frame structure defining an optical aperture and the frame structure is disposed proximate to the opening. The light fixture also includes two or more film tensioners associated with the frame structure. The light fixture also includes at least one light source positioned between the one or more reflective surface and a plane defined by the optical aperture. The light fixture further includes at least one optical film comprising at least one lenticular lens surface and the at least one optical film is suspended substantially parallel to the optical aperture by the two or more tensioners. According to another example embodiment, a frame assembly is provided for attaching to a light fixture. The frame assembly is configured for modifying light from the light fixture. The frame assembly includes a frame structure that includes an optical aperture defined by at least a portion of the frame structure. The frame structure also includes two or more film tensioners integrated into the frame structure and configured for suspending optical film parallel to a plane defined by the optical aperture. The frame structure also includes one or more reflective inner surfaces. The one or more reflective inner surfaces include at least a back reflective surface. The frame assembly also includes at least one optical film. The at least one optical film includes least one lenticular lens surface. The at least one optical film is suspended adjacent to the optical aperture by the two or more adjustable film tensioners.

According to another example embodiment, a frame structure is provided that includes two or more corners. The frame structure also includes an optical aperture defined by at least a portion of the frame structure. The frame structure also includes two or more adjustable film tensioners integrated into the frame structure. The two or more adjustable film tensioners are configured for suspending optical film parallel to a plane defined by the optical aperture. The frame structure also includes one or more reflective inner surfaces. The one or more reflective inner surfaces reflect about 70% to about 100% of incident light, and the incident light is reflected in a substantially diffuse or lambertian reflectance distribution pattern.

According to an example embodiment of the invention, an auxiliary film holder assembly is provided. The assembly includes at least two bi-stable strip clips and one or more clip strip mounts. The at least two bi-stable strip clips are configured to be activated in either a stable open position or a stable closed position upon activation force, where the stable open position is configured to accept one or more films, and where the stable closed position is configured to securely hold the one or more films.

According to an example embodiment of the invention, a light fixture is provided. The light fixture is configured for illuminating subjects and it includes an enclosure cavity. The enclosure cavity includes an opening and one or more reflective inner surfaces. The one or more reflective inner surfaces include at least a back reflective surface. The enclosure also includes a frame structure comprising an optical aperture defined by at least a portion of the frame structure. The frame structure is disposed adjacent to the enclosure cavity opening. The enclosure also includes at least one light source for generating light. The at least one light source is positioned between the back reflective surface and the plane defined by the optical aperture. The enclosure also includes at least one optical film. The optical film includes least one lenticular lens surface, and the at least one optical film is suspended or supported adjacent to or covering the optical aperture. According to an example embodiment the least one optical film is suspended by a rigid substrate comprising glass or one or more transparent rigid synthetic substrates such as acrylics or polycarbonates.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
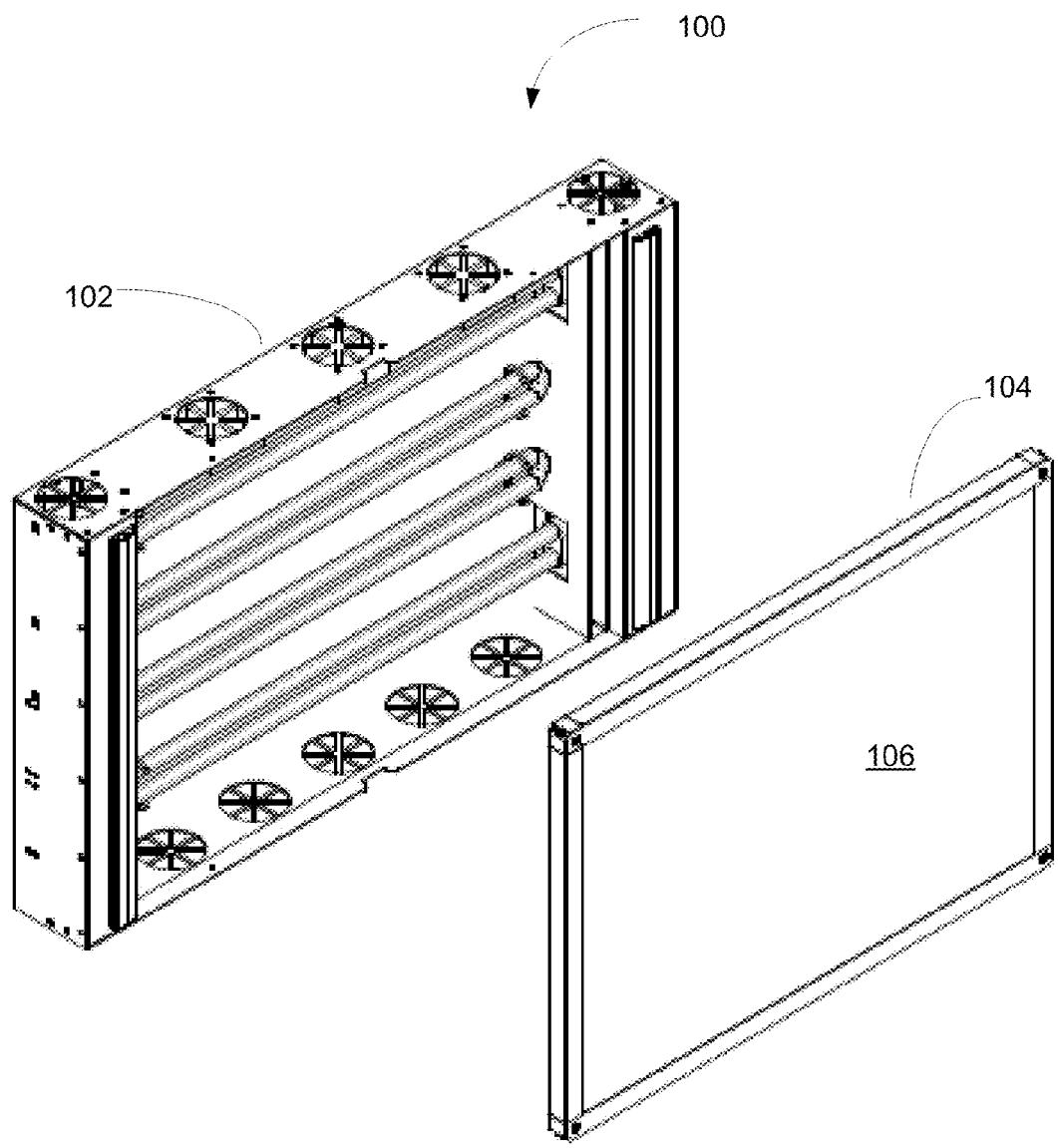
FIG. 1 depicts a perspective view of one example embodiment of a light fixture with the frame structure separated from the fixture.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable the making and using of a compact and efficient light fixture. According to certain example embodiments, a light fixture for illuminating one or more subjects is provided. According to example embodiments, the light fixtures may possess many features that provide certain advantages over current traditional softbox and studio soft light designs. Embodiments of the light fixture may include one or more of the following features or characteristics:

a) an output surface that exhibits a high degree of illumination uniformity;

b) a high degree of efficiency to maximize light output levels;

c) condensed illumination angles in one or both of the horizontal and vertical planes with a minimum of output loss;

d) the ability to incorporate linear fluorescent lamps or multiple LED's as lamp or light sources;

e) a stable operating temperature to minimize color shift of the lamps and increase lamp life;

f) a front reflector that is easily removable for quick access to the lamps;

g) a very slim profile;

h) an ability to be quickly converted to a fill light with a wide dispersion pattern;

i) lightweight;

j) low manufacturing costs;

l) a means to easily and efficiently attach optical films such as diffuser or colored gels to the front face; and m) a quick and efficient setup on location;

Some or all of the features or characteristics indicated above will be discussed with respect to example figures, example embodiments, and example descriptions. It should be clearly understood that the light fixture embodiments described herein are examples, and may be adapted for use with many different designs and configurations including, but not limited to: different lamp types and sizes; different output panel size requirements; the use of remote ballast arrangements; different fixture mounting requirements; different fixture dimensions; different ventilation requirements; different electronics or light control requirements; etc. For example, multiple light emitting diodes (LED's) or LED panels may be used as the light source. The LED example embodiment configuration, for example, may be made with a fixture profile that may be substantially thinner than those profiles that utilize fluorescent or other light sources.

One aspect of the invention, according to example embodiments, is to provide a means for achieving the maximum possible amount of light scattering within the light fixture and to achieve the maximum uniformity of light distribution across an optical aperture where the light exits the fixture. Another aspect of the invention, according to example embodiments, is to provide a means for condensing or focusing the light output illumination in one or more dimensions.

Various concepts, designs, and parts may be combined to produce desired operating specifications for the light fixture, according to example embodiments of the invention, and will now be described with reference to the accompanying figures.

FIG. 1 depicts an exploded perspective view of an example light fixture (100). In an example embodiment, the light fixture (100) may include an enclosure assembly (102). In an example embodiment, a frame assembly (104) may be configured to house and/or suspend one or more optical films (106). In an example embodiment, the frame assembly (104) may be configured to attach to the enclosure assembly (102). In an example embodiment, the frame assembly (104) may be configured to detach from the enclosure assembly (102).

Figure 2:
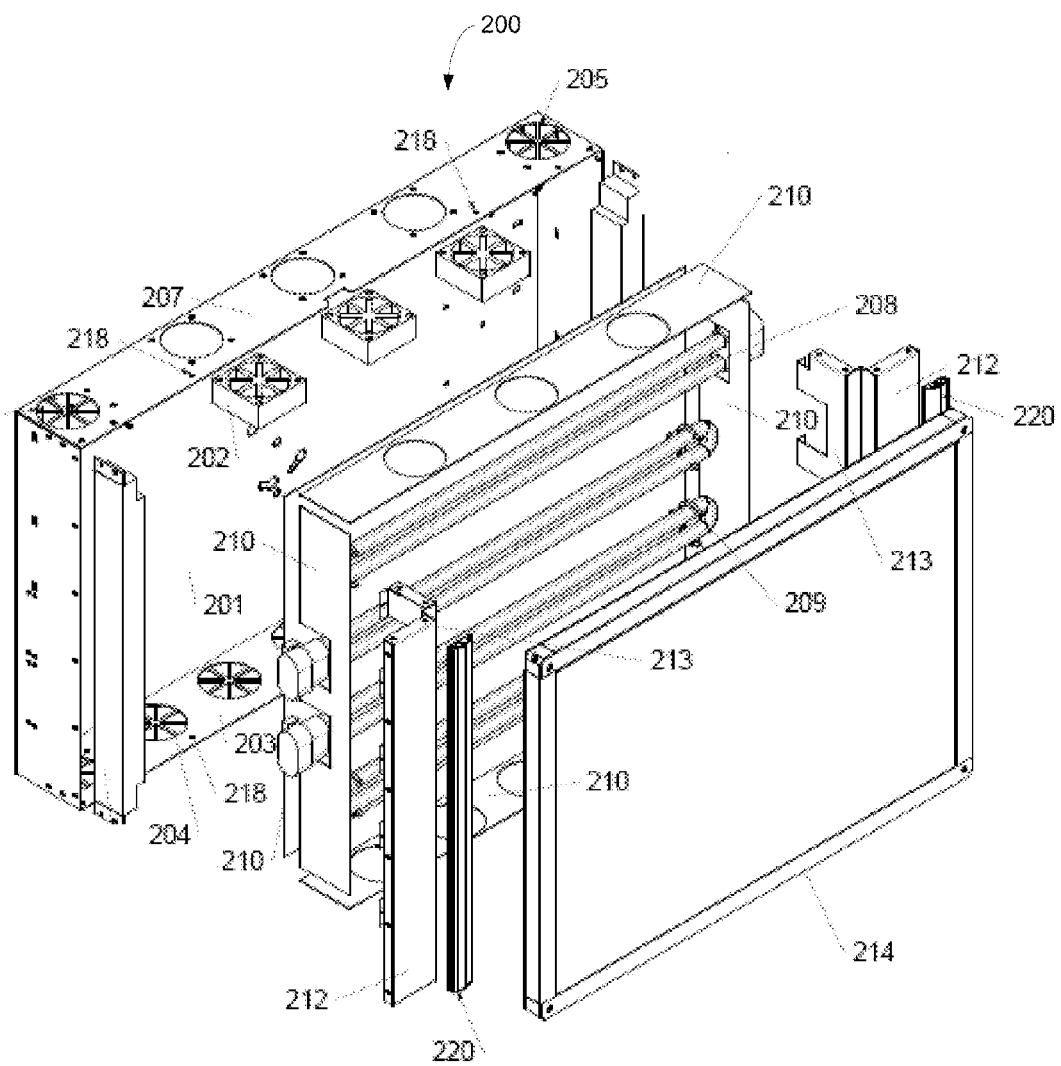
FIG. 2 depicts an exploded perspective view of an example embodiment of light fixture.

Additional details and components of the light fixture (100) will now be discussed with reference to FIG. 2. In accordance with example embodiments of the invention, FIG. 2 depicts an exploded view of the light fixture (as in 100 of FIG. 1). In an example embodiment, the light fixture (200) may include two enclosure side panels (213), enclosure back panel (201), enclosure top panel (207) and enclosure bottom panel (203) which may all be lined with reflection material (210), and together with the frame structure (214), may comprise a light recycling cavity.

Common to reflectors in studio light fixtures is the use of metallic or mirrored reflecting material, which typically have a low diffuse reflectance and a high specular reflectance value. Such specular reflectors are relatively ineffective in terms of increasing light scattering within the enclosure. Therefore, light scattering within the enclosure cavity may be best served by providing reflection panels that have a high amount of diffuse reflectance to spread the light in a more lambertian reflectance pattern. According to an example embodiment of the invention, the reflection material (210) may include a material that has high overall reflectivity, with efficiency preferably over 95%. The reflection material (210), for example, may also provide a diffuse reflectance of over 95%. Example materials that may provide such characteristics include foamed microcellular PET plastic sheets. Such example materials may be obtained from Kimoto Tech Inc and include products such as the REF-WHITE series of reflector sheets. According to an example embodiment of the invention, the reflection material (210) may exhibit an essentially flat reflected color temperature curve throughout the visible light spectrum so that coloration is not introduced in the output light. In other example embodiments, the reflection material (210) may be selected or coated with certain optical coatings to provide a certain color temperature curve that accentuates certain wavelength bands for desired light output coloration. Such reflection material (210) selection, for example may allow color correction of certain light sources.

According to example embodiments of the invention, the reflector material (210) may be cut into individual pieces and adhered to the corresponding panels of the enclosure. According to other example embodiments of the invention, the reflection material (210) may include a continuous folded piece that is cut at the corner seams and adhered to the inside of the enclosure. In an example embodiment, the reflection material (210) may include holes and slots cut as necessary, for example, to accommodate fan and ventilation holes. According to an example embodiment, certain parts of the light fixture (200) may be formed from sheet metal, or any other suitable material.

According to an example embodiment of the invention, the light fixture (200) may include a frame structure (214), which may include one or more optical films that form a partially reflective and partially transmissive optical aperture from which the light may exit the light fixture (200).

Figure 3A:
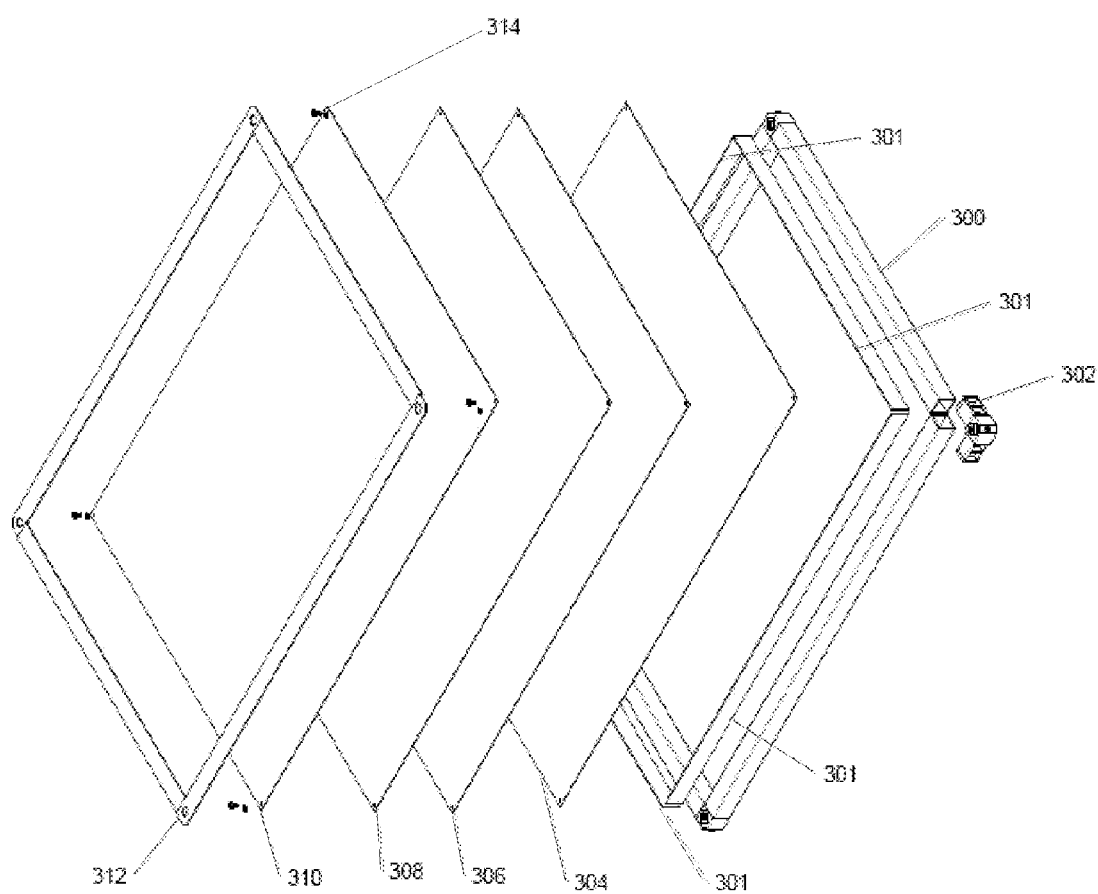
FIG. 3a depicts an exploded perspective view of an example embodiment of a frame structure.

FIG. 3a depicts example aspects of the frame structure according to certain example embodiments. For example, the frame structure may be configured to suspend a first prism film (306) and may optionally suspend a second prism film (308). In an example embodiment of the invention, the films (306, 308) may be oriented to have the structured side facing away from the inside of the enclosure, and the smooth side facing the inside of the enclosure. An example explanation of the prism film operation will now be discussed with reference to FIG. 8.

Figure 8:
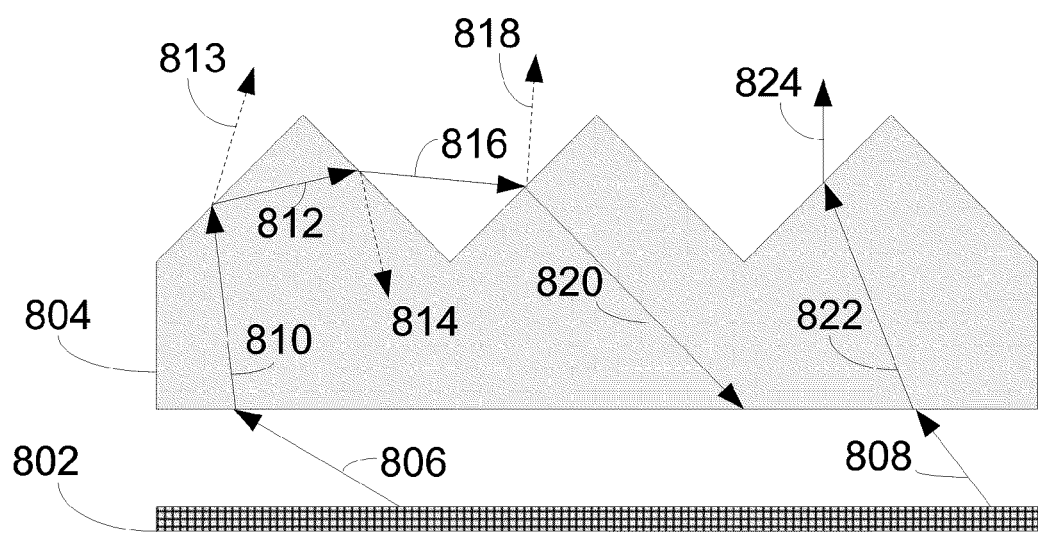
FIG. 8 depicts a cross sectional view of a prism film.

FIG. 8 depicts an example cross sectional view of prismatic optical film. In an example embodiment, the prismatic structure may be embossed on one surface of a plastic substrate (804). According to an example embodiment, the prisms may be aligned in a directional axis with respect to the plane of the plastic substrate (804). In example embodiments, the prismatic films may be utilized to redirect off-axis light to an output direction that is closer to the normal axis of the output surface. In and example embodiment, the prismatic film may reflect on-axis light incident on the bottom surface (non structured side) and recycle this light backwards into the enclosure, while refracting off axis light through the top surface generally in the direction of the normal axis of the output surface. In an example embodiment, approximately 50% of the light incident on the bottom surface of a single prism film may be recycled, and if two prism sheets are utilized at right angles to each other, the amount of light recycled could be as high as approximately 75%. According to example embodiments, the light rays may make many reflections within the surfaces of the enclosure before finally being refracted through the output surface, thus scattering and "mixing" the light. According to an example embodiment of the invention, the percentage of light loss from all of the internal reflections (including reflections off the reflector material (210) may be extremely low, and therefore, the overall light loss may be very low, and the light output efficiency of the light fixture may be high.

FIG. 8 depicts example light ray interaction with the prism film. For example, an off-axis ray (806) may be emitted from the light source (802) and may be incident on the non-embossed surface of the plastic substrate (804). According to Snell's Law, the internal ray (810) may be refracted towards the normal of the plane of the plastic substrate at the first air-film boundary due to the higher refractive index of the film, which may have an index of refraction of approximately n=1.5. Depending on the angle of incidence of initial off-axis ray (806), the refractive index of the film (804), and the polarity of the incident light electromagnetic field, the internal ray (810) may be transmitted (813) and/or reflected (812) at the second film-air boundary. The reflected (812) portion of the light may encounter a third film-air boundary where it may internally reflect (814) back into the film for recycling, or it may transmit (816) across the film-air boundary, and may encounter an adjacent prism. The ray may then reflect (818)

from the prism surface to the output, or it may transmit (820) back into the film, where it may be recycled.

According to an example simplified embodiment, another off-axis ray (808) may be emitted from the light source (802), and may be refracted (822) towards the normal of the first air-film boundary. In an example embodiment, the refracted (822) ray may encounter the film-air boundary and may be transmitted (824) to the output, if the angle of incidence upon the film-air boundary exceeds the critical angle for total internal reflection.

According to example embodiments, the illumination output angle may be condensed in the direction perpendicular to the plane of the axis of alignment of the prism arrays, and slightly condensed in the plane parallel to the axis of alignment. In an example embodiment, the axis of alignment in the horizontal direction may produce an illumination output angle that is primarily condensed in the vertical direction, with a slight condensation in the horizontal direction. Example embodiments of the dispersion pattern described may be highly desirable in many studio lighting situations in which the intended subject is primarily in a horizontal plane, and the light that would otherwise be also dispersed on the ceiling and floor is now directed towards the intended subject instead of being wasted, or requiring the need for the unwanted light spill to be blocked.

Returning now to FIG. 3*a*, and according to example embodiments, an optional second prism film layer (308) may be included such that the axis of alignment of its prism arrays are disposed at right angles to that of bottom prism film (304). In this example embodiment, the full width half max (FWHM) brightness for illumination angle may be approximately 26 degrees with respect to the perpendicular of both the horizontal and vertical axes of the plane of the output surface, depending on the of the chosen prism films. Example embodiments of this concentrated illumination dispersion pattern may be highly desirable in studio lighting situations that require controlled lighting in both the horizontal and vertical planes. By changing the distance between the peaks of the prisms pitch, the dispersion characteristics in both the vertical and horizontal axis can be changed. In an example embodiment, the FWHM brightness illumination angle may be about 49 degrees off the perpendicular of the horizontal axis of the output surface, and about 35 degrees in the vertical axis with the proper selection of film parameters.

According to an example embodiment, light collimation or light condensing (along the vertical and/or horizontal direction) by the prism film may have the effect of increasing the relative output levels of the light exiting the film in the direction normal to the surface of the film. In a theoretically "ideal" light recycling cavity, the "ideal" light output along an axis normal to the surface of the film can be as high as 140% or more compared to the a light source without two prism films in place. However, the light recycling cavity described in the various embodiments may perhaps not be "ideal." For instance, in certain example embodiments, ventilation holes, fans apertures, and other practical considerations may allow a small percentage of the light to escape the enclosure. Also, according to certain example embodiments, the ratio of surface area of the lamps compared to the surface area of enclosure surfaces may be relatively large, which may lower the reflective efficiency of the light recycling cavity. Additionally, according to example embodiments, bottom and top diffusers may effectively lower the light output level.

According to example embodiments, a bottom diffuser film (304) is provided, which acts to diffuse the light entering the bottom prism film (304), and may result in more efficient operation of the prism films. The bottom diffusion film (304) also may diffuse the light entering the bottom prism film (304) and may result in efficient utilization, scattering, and mixing of the overall light within the light recycling cavity. According to example embodiments, reflected or recycled light from the prism film(s) may pass through a bottom diffuser (304) multiple times, which may serve to further diffuse the light in light recycling cavity.

According to certain example embodiments, a top diffusion film (310) may be utilized as the top (or outer-most film) in the film stack. According to example embodiments, the top diffusion film (310) may act to homogenize the output of the prism film(s), hide any undesirable effects of the prism film, and add a small amount of additional diffusion to the output light. Certain example embodiments of the top diffusion film (310) may have haze ratings in the range of approximately 45% to approximately 70%. According to certain example embodiments, the top diffusion film (310) may provide protection for the prism film surface disposed beneath, which may be very fragile, and easily damaged by contact. According to an example embodiment, the top diffusion film may be designed with additional hardness or other characteristics that may enable it to be cleaned with a damp cloth.

According to example embodiments of the invention, the optical films included in the optical aperture may be suspended and tensioned on a lightweight frame, with or without the use of a rigid surface to keep the films flat. Certain advantages may be achieved in example embodiment where the optical films are suspended without the rigid surface or substrate, including, for example:

a) the weight of the a clear rigid substrate and panel may increase the weight of the fixture, but portable studio light fixtures typically should be as lightweight ad possible;

b) a clear rigid substrate can decrease the light output by about 8-15% depending on its composition, due to absorption losses etc;

c) certain clear rigid substrates can warp and discolor over time, especially when used in a fixture with high output lamps such as in a studio light fixture, and d) certain clear rigid substrates may be prone to cracking and breakage, especially when used as a portable studio lighting fixture.

According to certain example embodiments of the invention, the frame structure may include a frame and film tensioning system for mounting optical films with or without a rigid substrate, and will be shown to exhibit the following advantageous characteristics:

a) the ability to apply tension to the films with sufficient force and uniformity to keep the films stationary, flat, and without any distortions;

b) to be rigid enough so as to not flex or bend under the force of the film tension, which may cause distortions in the films surfaces;

c) the films may be mounted to a substrate or attached to a film tensioning apparatus such that the film is flush with the frame and so that there are no gaps between the films and surfaces of the frame, and wherein the at least one optical film substantially covers the optical aperture and provides a continuous periphery defined by the frame structure, thereby restricting airflow of the ventilation system within the cavity, preventing unwanted light leakage, and increasing the usable surface area of the optical aperture;

d) the frame and film assembly may serve as a front access panel which can be quickly and easily removed from the light fixture. In studio lighting, lamps are often substituted with lamps of a different color temperature, such as daylight or tungsten to suit the shooting requirements;

e) the inner sides of the frame may fit flush with the sides of the enclosure to avoid protrusions within the LRD which would disruption the light recycling patterns and create increased airflow impedance; and f) to a have low cost of manufacture, with a minimum of tooling costs and labor requirements.

According to example embodiments of the invention, one or more rigid, transparent, substrate materials may be provided for protecting and/or supporting the film stack. According to an example embodiment, a polycarbonate material may be utilized for the rigid substrate material. In another embodiment, an acrylic material may be utilized for the rigid substrate material.

According to example embodiments, and as detailed above, the light from the light source may be scattered after striking the surfaces of the diffuse reflectance material inside the enclosure cavity. In an example embodiment, light rays that are reflected and then pass through the bottom diffusion film may be scattered even further. The light exiting the top surface of the bottom diffusion film may strike the bottom surface of the prism film(s) and a percentage of that light may be reflected back through the top surface of the bottom diffusion film, becoming scattered further. According to an example embodiment, light that is not reflected may be refracted through the prism film. In an example embodiment, the recycled light exiting the bottom surface of the bottom diffuser may enter the enclosure cavity, and (once again) reflect off the diffusive surfaces, thus starting the cycle over again. In an example embodiment, a portion of the light may make multiple cycles as described, until the ray angles are within the acceptance angle of the film(s) such that they refract through and exit the prism film, and finally exit the top diffusion film. According to an example embodiment, the result is that the output surface of the light fixture may exhibit a high degree of illumination uniformity, and to the naked eye, the surface may appear as an evenly lit panel with negligible perceptible variations or fluctuation in illumination uniformity across the exit aperture.

According to an example embodiment, the light fixture may exhibit a measured difference between the maximum and minimum output level on the output surface as low as one half F-stop. Comparatively, a typical dedicated traditional softbox manufactured by Photoflex Inc. of Watsonville Calif., may have a measured 1.8 F-stop difference between the maximum and minimum output levels on the output surface.

The descriptions of certain optical films disclosed herein are example embodiments, and are intended to show their operational aspects. However, there are numerous options and combinations of optical films that may provide different functions and/or exceed the performance of the films used as examples in this disclosure. For example, one embodiment may utilize films that combine the operation of one or more prism films and one or more diffusers into a single film. According to certain example embodiments, other films may be used, including light polarization films.

In accordance with certain example embodiments of the invention, and as disclosed above, two prism films may included in the light management film assembly. In certain embodiments, the output light dispersion pattern may be approximately 26 degrees (FWHM) off the perpendicular in both the vertical and horizontal plane. According to certain example embodiments, the light can be dispersed at a wider angle in both planes by the use of additional diffusion material mounted on the front frame of the light fixture. The degree of increase in angle of the light dispersion field may increases as the strength or amount of diffusion increases. Increased dispersion, for example, may be tailored to the application at hand by choosing the appropriate diffusion material and placement of the material. According to an example embodiment, one advantageous aspect of this method of diffusing the output light from the light fixture is that light loss is negligible or minimized. With a typical studio light fixture which has diffusion material mounted on the front frame of the fixture, the back scatter of light reflecting backwards from the rear of the diffusion material to a large degree does not get recycled, and may be lost either through escaping from the space between the diffusion material and frame of the fixture, or absorbed within the light fixture due to design inefficiencies. According to example embodiments of the invention, any light which is back scattered may re-enter the enclosure cavity through the optical films and may get recycled. According to example embodiments, and as will be discussed in detail below, the diffusion material may be secured to the front fame of the light fixture so that there is a negligible gap between the frame and the film. This example embodiment may further minimizing the amount of light that escapes and is lost or wasted.

According to certain example embodiments of the invention, other various films may be utilized with the light fixtures. For example, films including, but not limited to colored gels, color correction filters, diffusion material etc. Traditionally, such auxiliary films have been attached to the front of the typical light fixture with adhesive tape, or sandwiched between two metal frames and mounted on the front frame of the studio light fixture. Traditional softboxes typically have no mechanical means for securing auxiliary films to the front face, and therefore, improvised methods have been used. The disadvantages of the previous systems include:

a) the metal frame is heavy and increases the weight of the fixture, and is subject to being bent, b) it takes valuable time to fit the film properly onto the frame, c) a substantial gap between the film and the face of the fixture is created, which allows light to escape d) the frame elements and frame holder or track all need to be custom manufactured, which increases manufacturing costs e) it can add an inch or more to the profile of the fixture.

f) On a traditional softbox, improvised methods of attaching light modifying films to the front face are inefficient and can be difficult and time consuming to execute, especially in the presence of grids or louvers.

Figure 12:
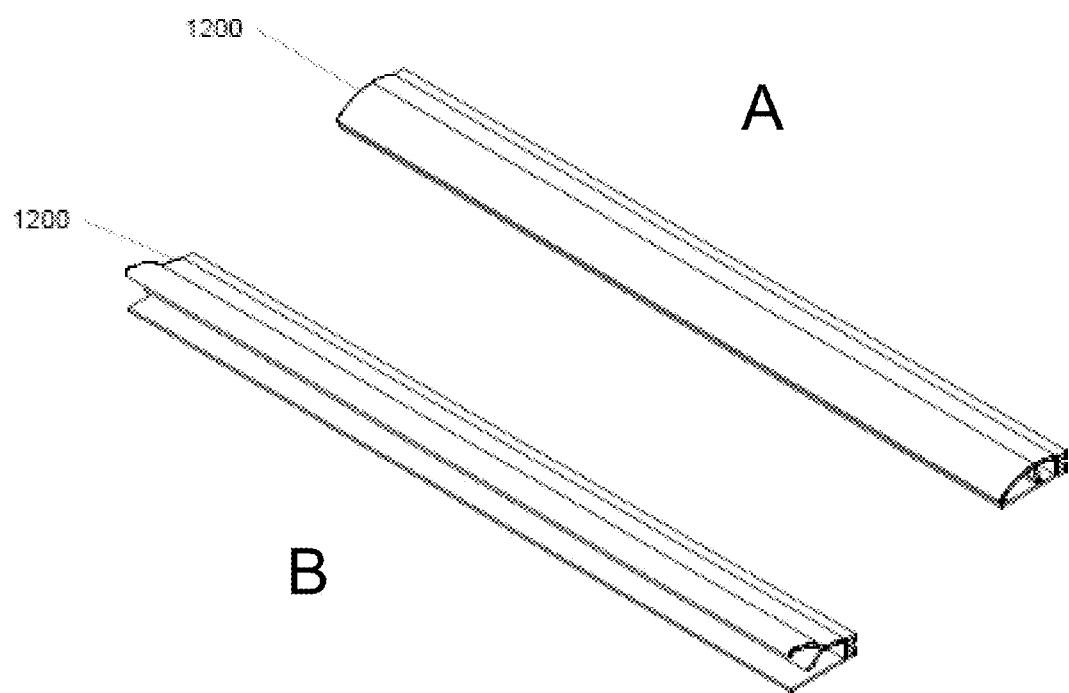
FIG. 12 depicts an example embodiment of an auxiliary film holder strip in both the open and closed positions.

According to an example embodiment of the invention, and as shown in FIG. 12, an auxiliary film holder (1200) is provided. FIG. 12 depicts the auxiliary film holder (1200) in both the opened (B) and closed (A) positions. In accordance with example embodiments of the invention, the auxiliary film holder may include at least two bi-stable strip clips, as shown in FIG. 12. For example, two bi-stable strip clips may be configured to be activated in either a stable open position or a stable closed position upon an appropriate activation force. For example, the stable open position may be configured to accept one or more film(s) (i.e., to slide one edge of the film easily between the two closing and clamping surfaces), or to release the film(s). In an example embodiment, the stable closed position is configured to secure the one or more films. According to example embodiments of the invention, the auxiliary film holder assembly may use one bi-stable clip strip at one end of the light fixture, and another bi-stable clip strip at the other end of the fixture.

According to certain example embodiments, the films that may be mounted to the front of the light fixture may include, but are not limited to colored gels, diffusion material, spun fiberglass, spun nylon, and other diffusing materials.

Many example embodiments can be envisioned for the placement and mounting of the auxiliary film holders. In one example embodiment, one bi-stable clip strip may be permanently or semi-permanently attached to one end of the light fixture. In an example embodiment, another bi-stable clip strip may be adjustably, and/or temporarily mounted to another end of the light fixture. For example, in one embodiment, the adjustable clip strip end may include magnets within the clip strip that may adhere to the light fixture with sufficient force to keep films within the auxiliary film holders taught. In another embodiment, a hook and loop material may be utilized to allow temporary and/or adjustable attachment of at least one end of the auxiliary film holder assembly.

According to an example embodiment, the auxiliary film holder (1200) may be manufactured using plastic extrusion. According to an example embodiment, the auxiliary film holder (1200) may be adhered to the front panel of softbox light fixture with a suitable adhesive or hook and fasteners. Example of the auxiliary film holder (1200) are shown, for example, in FIG. 2 (220), FIG. 5b (524), and FIG. 10 (1036). In an open position, for example, a film which is cut to the proper size may be inserted into the opening. In an example embodiment, a snap-able flap may be pressed down until it snaps in the closed position as shown to firmly clamp the film within the clip strip. In an example embodiment, a similar procedure may be done with the strip on the other side of the fixture. This bi-stable clip strip film mounting has several advantages over other typical film mounting systems, including but not limited to:

a) no heavy metal frame(s) and frame tracks, or holders are needed, which may save weight and custom manufacturing costs;

b) the film holder strips typically add only ⅜" extra to the profile of the fixture;

c) the strips may be fabricated from thin 0.04" thick plastic and weigh only a few ounces each;

d) the gap between the film and the face of the softbox is about 0.04" which allows only a negligible amount of light to escape;

e) the strip clips may be extremely inexpensive and "off the shelf" items which may save on manufacturing costs; and f) installing light modifying film may be quick and easy.

According to example embodiments of the invention, a frame structure is provided which may include frame members. Example frame members may be made from materials that include aluminum tubing, plastic tubing, etc. Although many sizes can be used, an example size is ¾" with a 0.05" wall thickness. Aluminum tubing has certain advantage properties; it is lightweight, rigid, readily available, and easily cut to size. Aluminum tubing can also be supplied with a black anodized finish that may save on painting costs (if the cosmetic appearance is applicable). According to example embodiments, the ¾" size may meet requirements for strength, having a thin profile, and being a standard size.

Figure 4A:
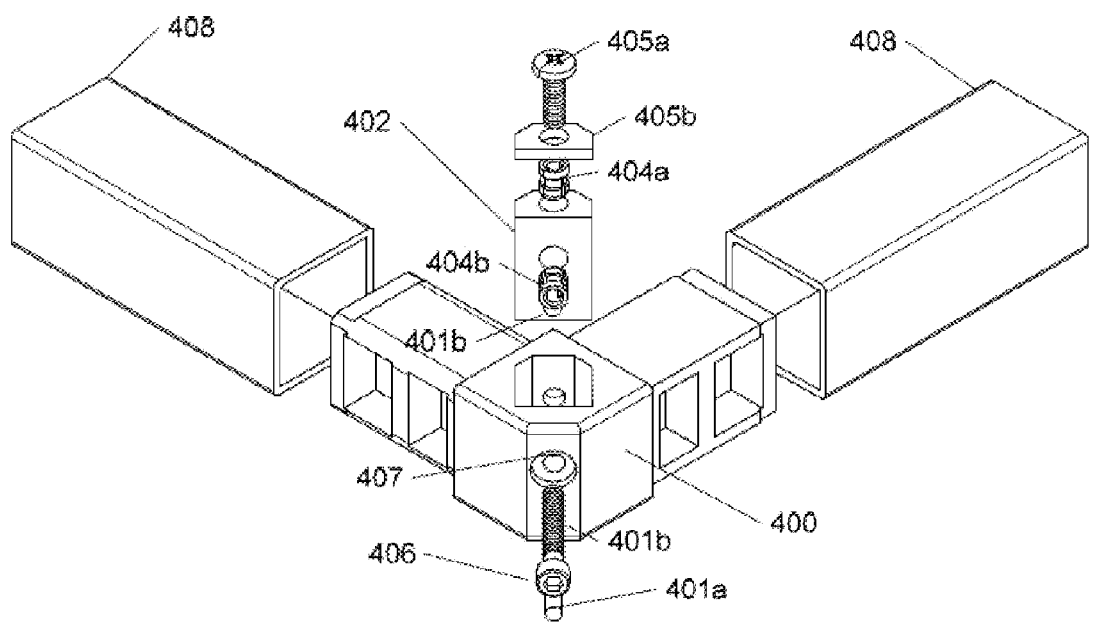
FIG. 4a depicts a perspective exploded view of one embodiment of a film tensioning system.
Figure 4B:
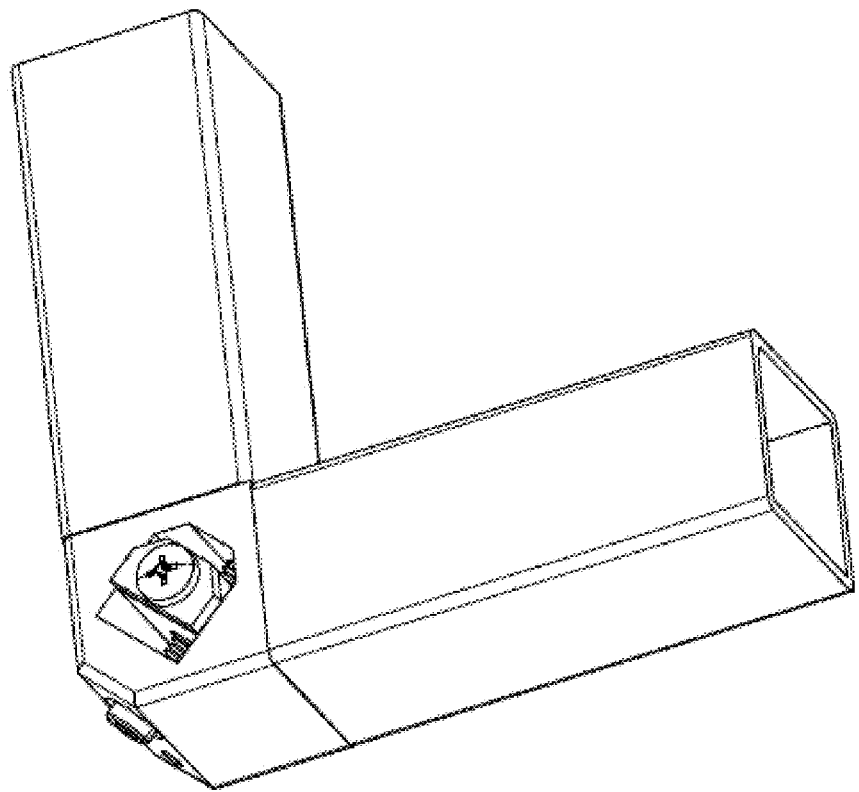
FIG. 4b depicts a perspective non-exploded view of the film tensioning system shown in 4a FIG. 4c depicts a perspective exploded view of another embodiment of a film tensioning system.

Also, according to example embodiments of the invention, a frame structure is provided which may include film tensioners as depicted in FIGS. 4a and 4b. The tensioning device includes a base (400) which may be molded from a suitably strong material such as fiberglass-infused nylon. In an example embodiment, the base (400) may be inserted into the tube framing members, may be held in place with friction forces, and may not require it to be bolted to the frame members. In an example embodiment, disposed in the top face of the base (400) is a cavity (405) or channel, which may accept a sliding post (402). In an example embodiment, the major axis of cavity (405) may be set to 45 degrees, or it can be aligned such that it shares the same major axis as the base (400) cavity on the diagonal opposing corner of the frame. It has been found that a 45 degree angle is acceptable regardless of the overall frame structure dimensions, and has the advantage that this tensioner can be used at corner locations. According to an example embodiment, a post (402) may sit flush within the channel, and may be laterally supported by the two side walls and by the bottom side of the channel, and is able to slide freely along the channel boundaries. The sliding post (402) can also be molded from the same material as the base (400). Disposed in the sliding post (402), for example may be two threaded metal inserts (404a and 404b) such as those manufactured by Penn Engineering. In accordance with example embodiments, these parts may be "molded in" inserts that may be placed in the mold during the molding process, thus imparting additional pullout and torque out strength to the inserts. Other types of inserts can be used as well.

According to certain example embodiments, a pin (401a) may be inserted through a pin mounting hole (401b) which passes through the base (400) and sliding post (402). The pin mounting hole on sliding post (402) may allows the sliding post (402) to slide freely over the pin (401a), and may function as a guide track to give additional stability to the sliding post (402). In an example embodiment, a tensioning screw (406) may pass through the tensioning screw hole (407), and the tensioning screw (406) may thread into a threaded insert 404b on the sliding post (402). According to example embodiments, the action of turning the tensioning screw (406) may cause the sliding post to slide in the channel (405), which in turn may create tension on the attached film(s). According to example embodiments of the invention, each tensioning device may be adjusted individually to impart the required uniformity and strength of tension across the film(s).

According to example embodiments, a threaded Insert (404a) may receive a film clamp screw (405a) and film clamp (405b) which may clamp the corresponding corner of the optical film stack firmly to the sliding post. In an example embodiment, a suitable adhesive can be applied between each film layer in the corner areas to be clamped by the film clamp (405b) in order to provide additional lateral stability to each film layer.

Figure 3B:
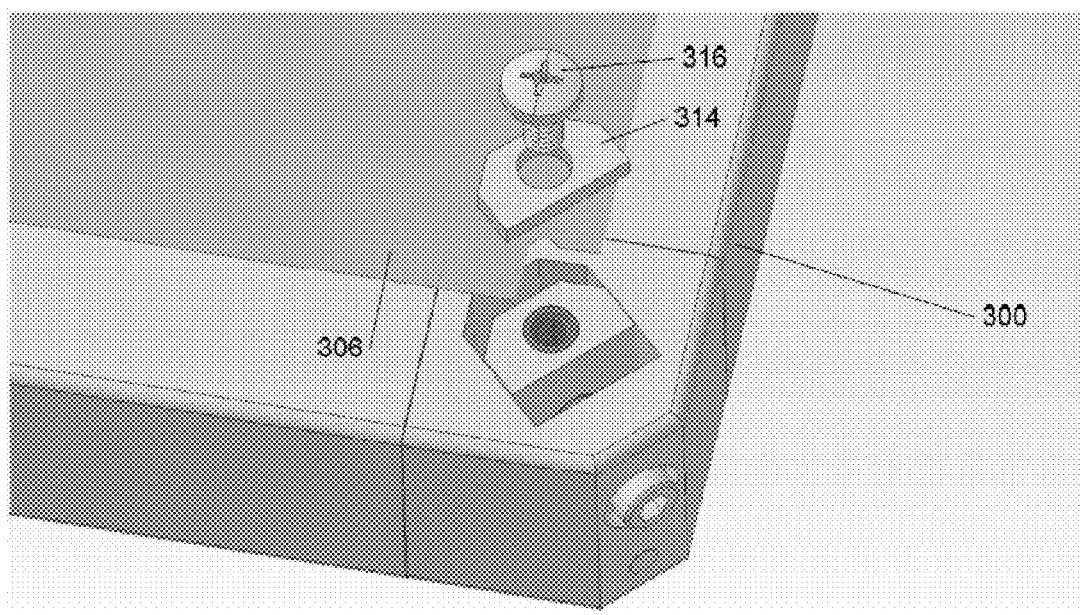
FIG. 3b depicts an exploded perspective view of another example embodiment of a frame structure.

Returning now to FIG. 3a, this figure depicts a complete frame structure for the light fixture (such as (214) shown in FIG. 2) which may utilize the film tensioners shown in FIG. 4a and FIG. 4b. Although FIG. 3a depicts a frame structure which utilizes four such film tensioners, in an example embodiment, only two such film tensioners may be mounted in two opposing corners, provided that the two fixed connectors and two film tensioners secure each frame member (300) in a sufficiently rigid manner, so as not to allow the frame structure to flex or bend beyond the required range. In this example, the film clamp may be attached to the frame connectors (302b) and film tensioner assembly (302a) with a screw that may protrude through holes in the film corners. In FIG. 3b, the film clamp may be attached to the frame connectors (302b) and film tensioner assembly (302a) with a screw that does not protrude through holes in the film corners.

Figure 4C:
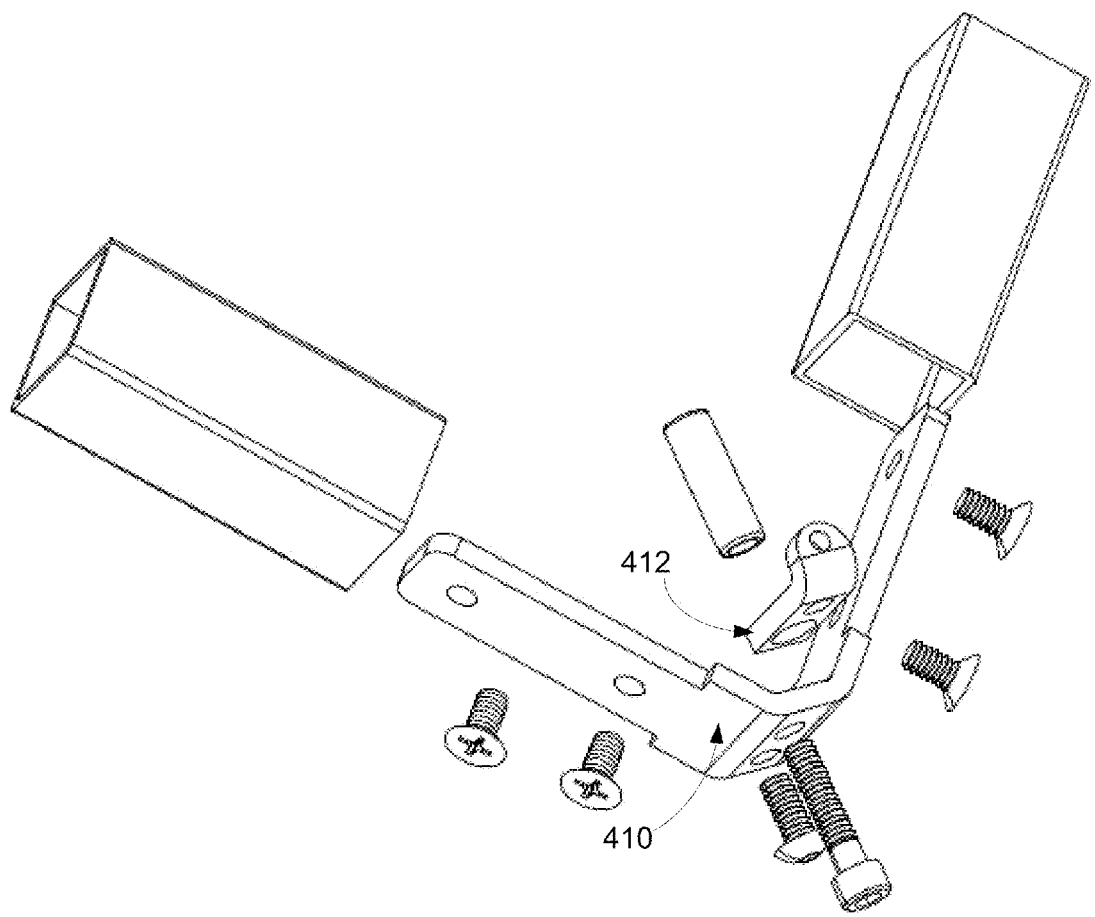
FIG. 4d depicts a perspective non-exploded view of the film tensioning system shown in 4c.
Figure 4D:
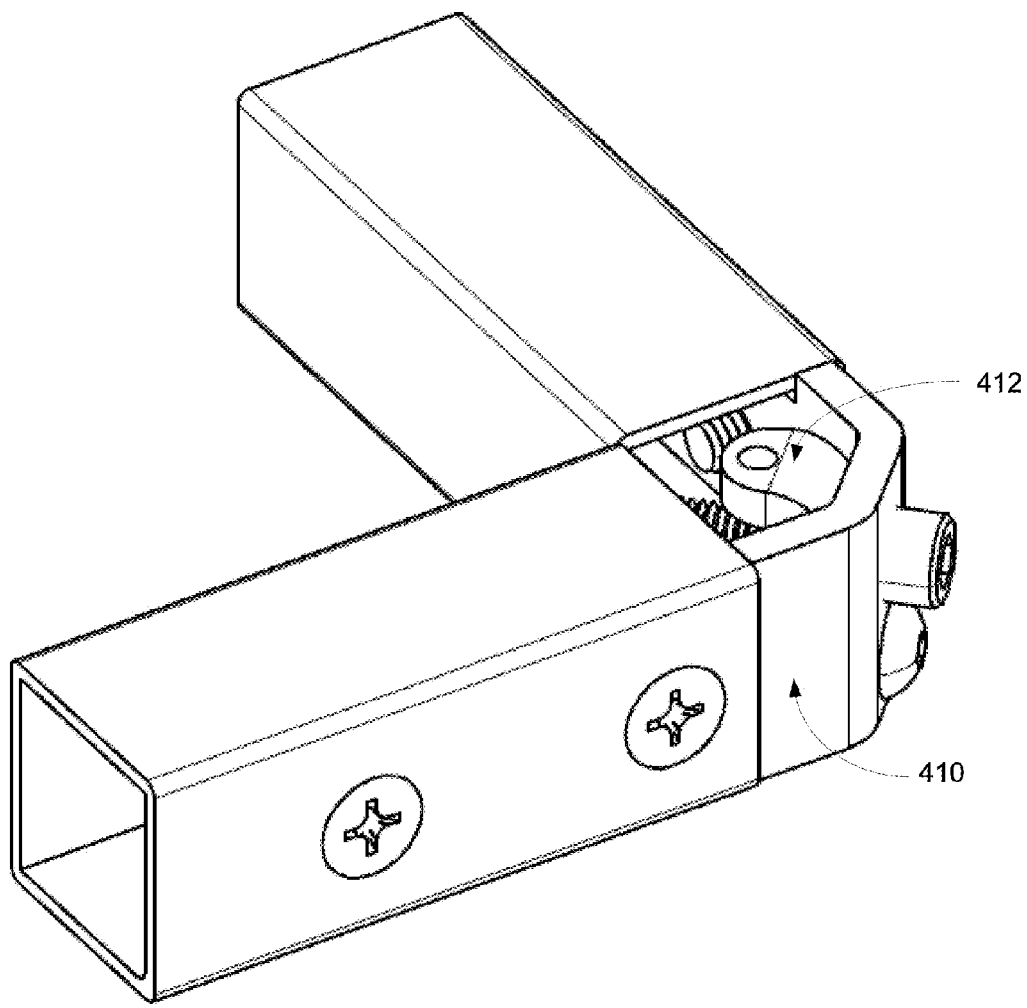

Another example embodiment tensioning device is depicted in FIG. 4c and FIG. 4d. According to this example embodiment, this film tensioning includes a base (410) and a slider (412) that can be fabricated from sheet metal, and does not require tooling costs to create molds as would be required with plastic type tensioners.

Figure 9A:
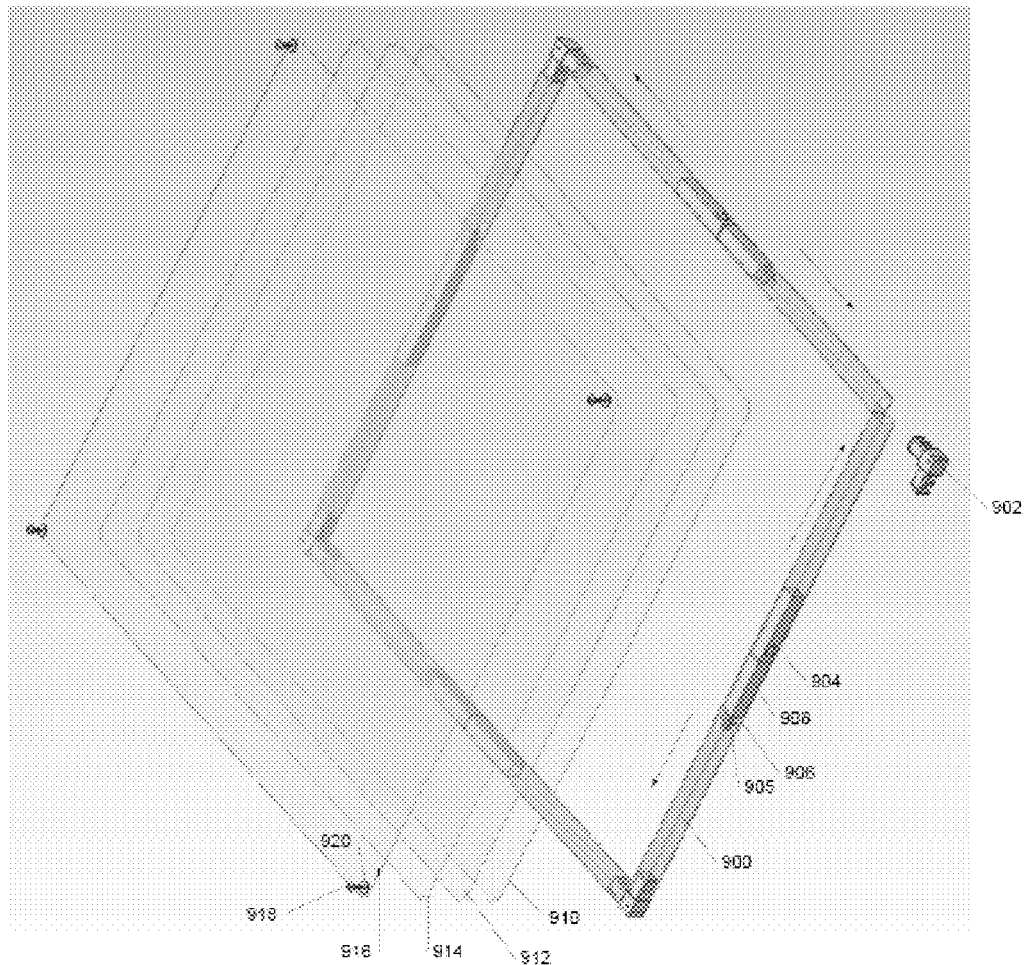
FIG. 9a depicts an exploded and partially transparent view of an example embodiment of frame structure.
Figure 9B:
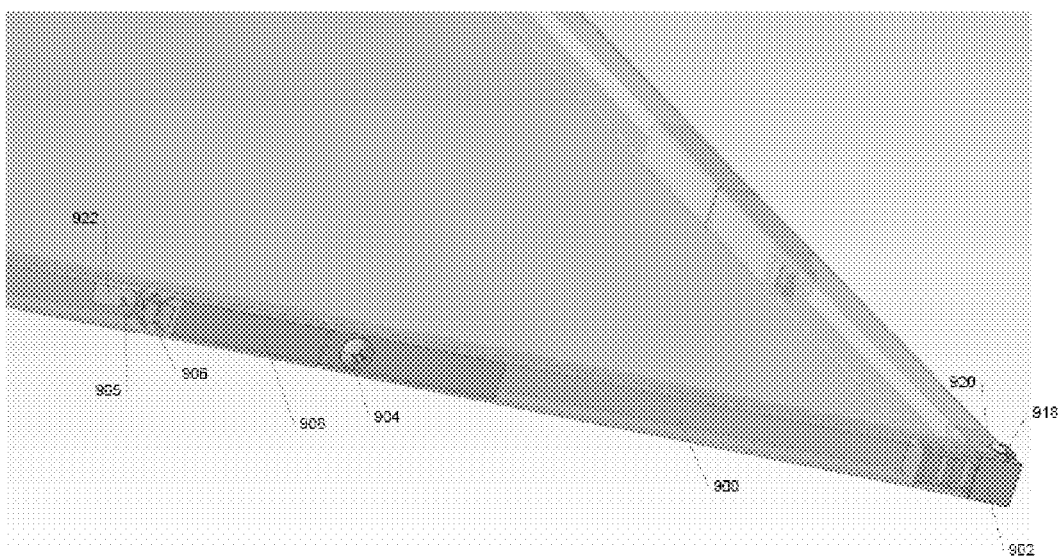
FIG. 9b depicts another exploded and partially transparent view of an example embodiment of frame structure.

According to other example embodiments, and as depicted in FIG. 9a and FIG. 9b. tensioning devices may be nested inside each of the frame members. For example, each of the fours sides of the frame may be made up of two equal length sections of tubing (900), which may be ¾" aluminum tubing as described previously. Each section of tubing (900), for example, may be joined together at the corners with a standard off the shelf plastic 90 degree connectors (902). In an example embodiment, an inner sleeve (908) may nest inside, and overlap both frame members (500) for each side of the frame, as shown. In an example embodiment, the inner sleeve (508) may be made from aluminum tubing with a ⅝" outer diameter, which is approximately 0.025" smaller than the inside diameter of the ¾" frame members (500). This allows the inner sleeve to slide freely inside the frame members (900).

According to an example embodiment, one end of each inner sleeve (908) may be set to overlap the corresponding frame member (900) by the same fixed amount, and may be secured in place by an inner sleeve retaining screw (904), which can be a self-tapping type. In an example embodiment, one end of each inner sleeve (908) may include an insert fastened firmly inside such that the end of the hollow sleeve may be closed and may form a suitable flat base for adjusting screw (905) to push against.

According to example embodiments of the invention, a so called "tube connector" such as manufactured by Carpin Manufacturing may provide a threaded insert to fit securely inside tubing. In this example embodiment, such an insert may be used as a tensioner base (906) which and may be inserted into frame members (900) as shown FIG. 9*a* and/or FIG. 9*b*. According to an example embodiment, a tensioning screw (905) may be threaded through the threaded insert of each tensioner base (906), and may subsequently rest against the closed end of each inner sleeve (908). In an example embodiment, when the tensioning screw (905) is turned, force may be applied to the inner sleeve to create a tensile force between the connected corresponding frame members (900). In accordance with an embodiment, the opposing tensile force may be applied to each of the four corners of the frame structure, and subsequently, may apply tensile to the film stack.

According to an example embodiment, the film stack may be clamped to the frame connectors (902*b*) with film clamp (920) and film clamp retaining screw (918). In an example embodiment, an adjustment opening (922) may be provided to access the film clamp retaining screw with an Allen key or the like.

When installed in the softbox as shown in FIG. 2, and according to example embodiments of the invention, the top edges of frame structure may be flush with the top edges of the enclosure. The frame members of the two shortest sides of frame structure may nest on the right angled ledges on the inner panels (212), and the frame structure may be secured with four screws (218), two on the enclosure top panel (207) and two on the enclosure bottom panel (203). Accordingly, the frame structure can be removed or installed on the softbox with four screws. In an example embodiment, the surfaces of the frame tubing that are exposed to light in the enclosure may be lined with reflective material, which can be the same material as used elsewhere in the enclosure.

As previously revealed, frame structure of this disclosure exhibit at least the following advantages:

a) tension of sufficient force and uniformity may be applied to the optical films to maintain the films stationary, flat, and without any distortions;

b) the frame and tensioning devices are rigid enough so as to not flex or bend under the force of tensioning the film which would cause distortions in the film surfaces;

c) the need for a rigid surface in the optical aperture to mount the film on is eliminated;

d) the film edges are situated directly on the top surface of the frame such that there are no gaps between the film surfaces and the frame, which would interrupt the airflow of the ventilation system, allow light leakage, and decrease the usable surface area of the optical aperture;

e) there are no opening in the film surface over the optical aperture which would interrupt the airflow of the ventilation system, allow light leakage, and decrease the usable surface area of the optical aperture;

f) requires only two tensioning devices; and g) has an advantageously low cost of tooling, manufacture, and assembly labor.

According to an example embodiment, fluorescent lamps with bases (208) may be mounted on the back panel of the enclosure (201) and above the rear-reflecting panel (210). According to an example embodiment, the lamps can be chosen for their size and output to match the requirements of the light fixture. T-5 HO Biax lamps, for example may be utilized for a light source. Numerous sizes of fluorescent lamps may be used with satisfactory results, depending on the configuration of the contemplated light fixture. The lamps chosen in this embodiment or any embodiment should not be construed as to limit the type of lamp used. Furthermore, other types of lamps maybe used instead of fluorescent lamps, including but not limited to LED lamps etc.

According to certain example embodiments, it may be advantageous to have the depth of the enclosure as shallow as possible in order to create a thin light fixture. A thin design may be advantageous in studio lighting for many reasons. There are situations where there are space restrictions at the location being lit, a thinner design translates into an overall lighter and more portable softbox that saves on transportation costs and setup, manufacturing costs are reduced, the visual appeal of the softbox is increased etc. The shallowness of the depth may be limited by the requirement to have the light output surface be uniformly lit with no hotspots or darker areas. This uniformity of illumination may be determined by several factors, which include lamp-to-lamp spacing (if multiple lamps are used), lamp to diffuser spacing, bottom diffuser characteristics, the lamp thickness, and total surface area of the lamp. Light becomes less scattered and diffused within the enclosure as the depth decreases, the lamp to lamp spacing decreases, the diffusion level of the bottom diffusion layer is lowered, and the lamp surface area increases. Through testing, it has been determined that for typical configurations of light fixtures contemplated in this disclosure, the shallowness of depth may be limited due to practical factors rather than that of light output uniformity. For example, in certain embodiments including cooling fans, the fan size used for ventilation requirements in the softbox light fixture may be the limiting factor for the depth of the light fixture.

According to example embodiments of the invention, ventilation and/or cooling of the light fixture may be crucial to its performance. Fluorescent lamps, for example, typically used in studio light fixtures are of the high output type. While they generate much less heat than "hot" lights such as tungsten, sodium etc, they do generate a considerable amount of heat. Excessive heat in an enclosure may cause the lamp to operate above its optimum operating temperature, causing its color temperature to rise, and to change the color balance. Color shifts may be very undesirable in studio lighting, as accuracy of the colors rendered of the recorded images is important. Additionally, life expectancy of the lamp may decreases as average operating temperatures rise.

In accordance with example embodiments, an active ventilation system with fans is provided to achieve the required cooling in the light fixture and associated components. One concern with active ventilation systems (particularly for use in certain environments), is fan and air movement noise. Sound is often recorded on the set of a location, and on dedicated quiet soundstages or studios; therefore, the level of the noise must be able to be lowered to a level that is acceptable in even the most demanding situations. According to an example embodiment of the invention, fans may be included in the light fixture to provide adequate levels of air movement while achieving acceptable sound levels. In an example embodiment fans with an approximate 60 mm (2.35") diameter may be utilized, and may be a able to physically fit in the thin profile of the example softbox light fixture configurations.

In accordance with example embodiments of the invention, the ventilation system may be divided into two separate systems: the first system may be a passive convection style that may cool the ballasts, lamps, and electronics. In an example embodiment, as depicted in FIG. 2, the first ventilation system boundaries may be defined by the two enclosed areas between each of the inner panels (212) and sidewalls of the enclosure (200) where each ballast (206) may be situated. In an example embodiment, each end of the two enclosed areas may include a ventilation hole (205) on each end. In accordance with example embodiments, electrical components may be situated in these areas as well.

The second ventilation system may be active. In an example embodiment, the active ventilation system may serve to ventilate the enclosure having boundaries that may be defined by the inner reflecting surfaces of the enclosure. In an example embodiment, as depicted in FIG. 2, three fans (202) may be are mounted to the enclosure top panel (207) with screws and sound insulation gaskets, and may be wired such that they pull air out of the enclosure by pulling air into the enclosure from the five bottom ventilation holes (204). Example fans with suitable airflow vs. noise levels are manufactured by companies such as Silenx, Nexus etc. In an example embodiment, a three positioned switch and an arrangement of resistors (both not shown) may be connected to the fans to allow the user to select the fan speed which is best suited to the noise level requirements of the application. In an example embodiment, the lowest speed setting may be configured to obtain the lowest fan speed while still keeping the lamps barely within the acceptable operating temperature range. This setting may be appropriate for the most demanding situations like a dead quiet sound stage. The second setting may be configured to double the fan speed. This setting may have an acceptably low noise level for most applications, and may allow the lamps to operate comfortably within acceptable operating temperatures. The third setting may be configured to supply full operating voltage to the fans to operate at their peak airflow. This setting can be used when appropriate and may increase the life expectancy of the lamps.

According to example embodiments of the light fixture inventions presented herein provide many advantages over a typical studio soft light, including but not limited to greater light output for certain equivalent levels of diffusion and light collimation. Due to variability of design configurations of typical studio soft lights, direct comparisons are difficult. For instance, the efficiency of the rear reflector and the degree with which it collimates light is a large variable. For a comparison, the example light fixture, as shown in FIG. 2 for example, may include the optional second prism film, which may be used for comparison with typical studio fixture that has identical dimensions, lamps and electronics, and a moderately efficient rear reflector. It is further assumed that the light output of the studio fixture which has no light modifiers attached will be at the same level as the light fixture without the frame structure attached. This is a reasonable assumption since the high efficiency reflection material of the light fixture yields a similar light output level to that of a rear reflector with moderate collimation properties. The comparison requires that the studio fixture has an equivalent diffusion level and collimation as the light fixture.

To diffuse the output of the studio softlight for comparison, an example diffusion material which would give a reasonably high level of diffusion would be #430 Grid Cloth manufactured by Lee Filters USA, which is has a quoted specification of a 2½ F-stop, or 250% reduction in light transmission. In order to collimate the light exiting the diffusion material to approximate the output dispersion pattern of the light fixture, a black honeycomb grid may be placed on front of the diffusion material, such as a Narrow Zone Screen manufactured by Videsscence of Elmonte Calif., which has a quoted specification of a 1 F-stop, or 100% reduction in light transmission. In the comparison above, the studio soft light with light modifiers attached such that the level of diffusion and the output dispersion pattern approximates the light fixture, exhibits a light output level which may be up to 350% lower than said example light fixture.

Figure 5A:
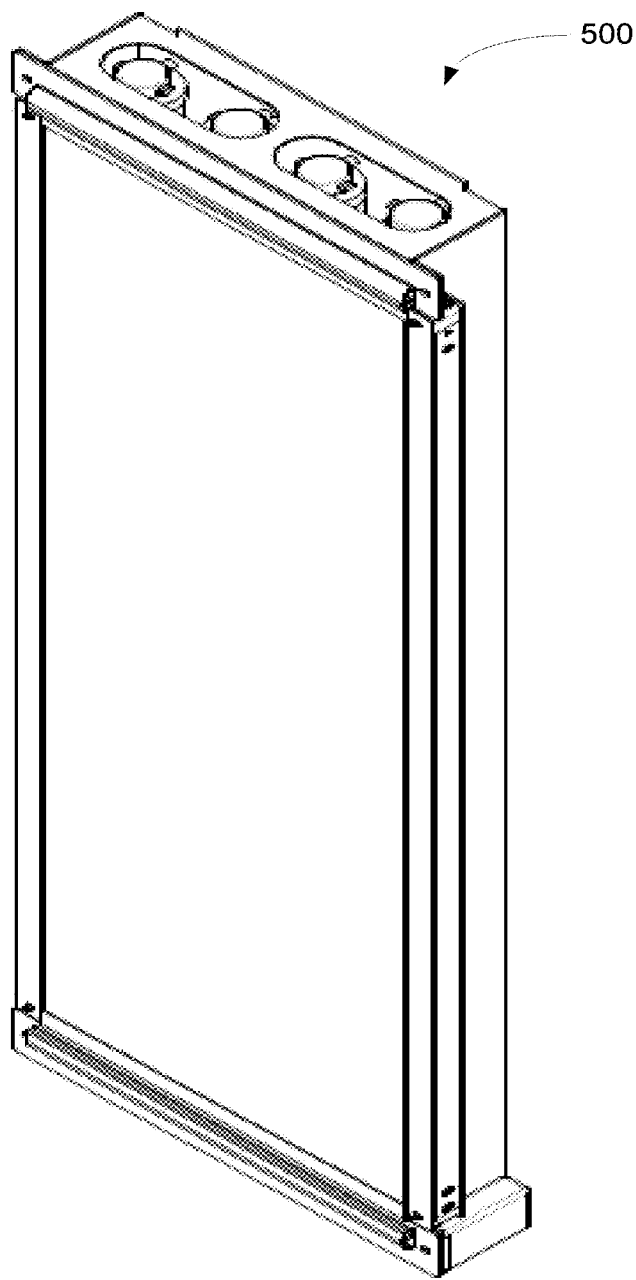
FIG. 5a depicts a perspective view of an example embodiment of a light fixture.
Figure 5B:
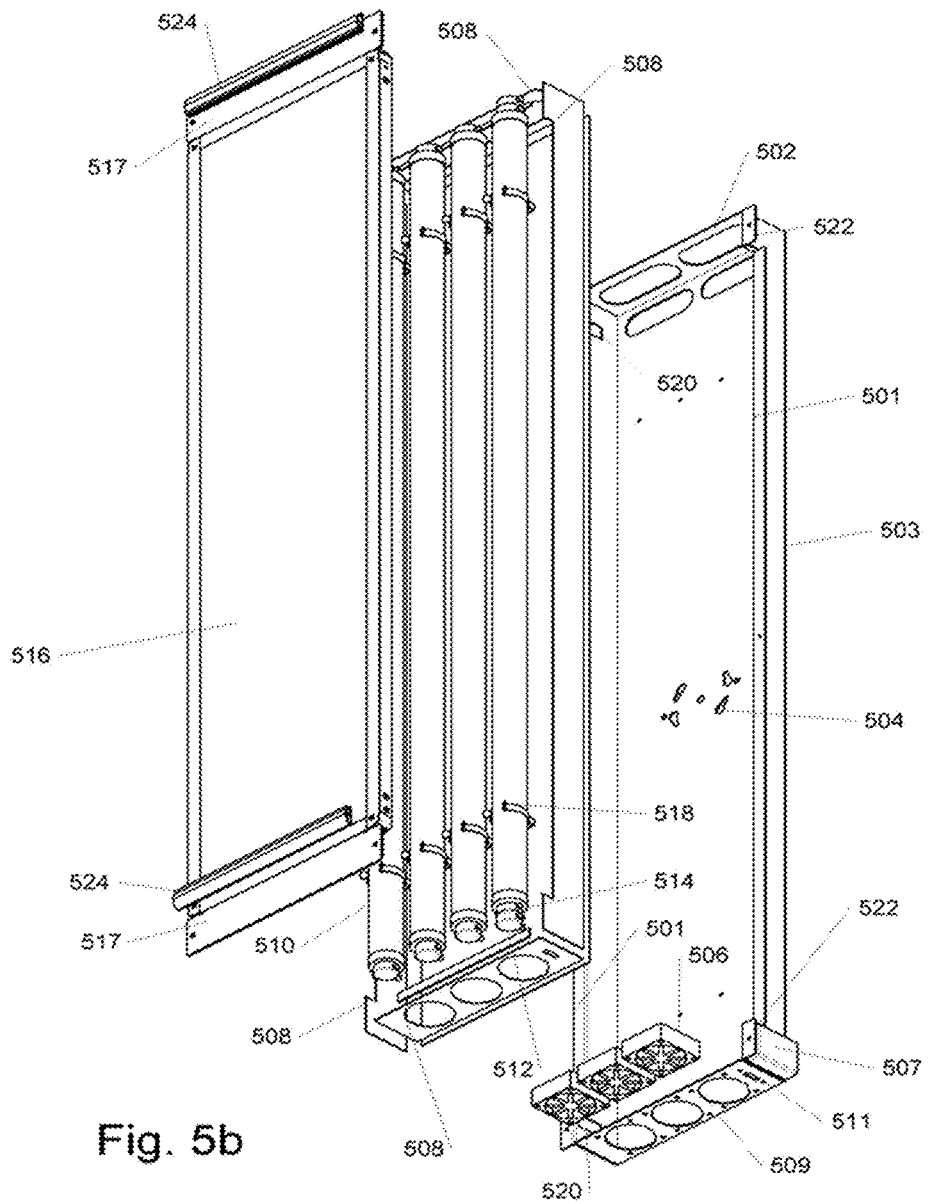
FIG. 5b depicts a perspective exploded view of an example light fixture, according to an example embodiment.
Figure 6:
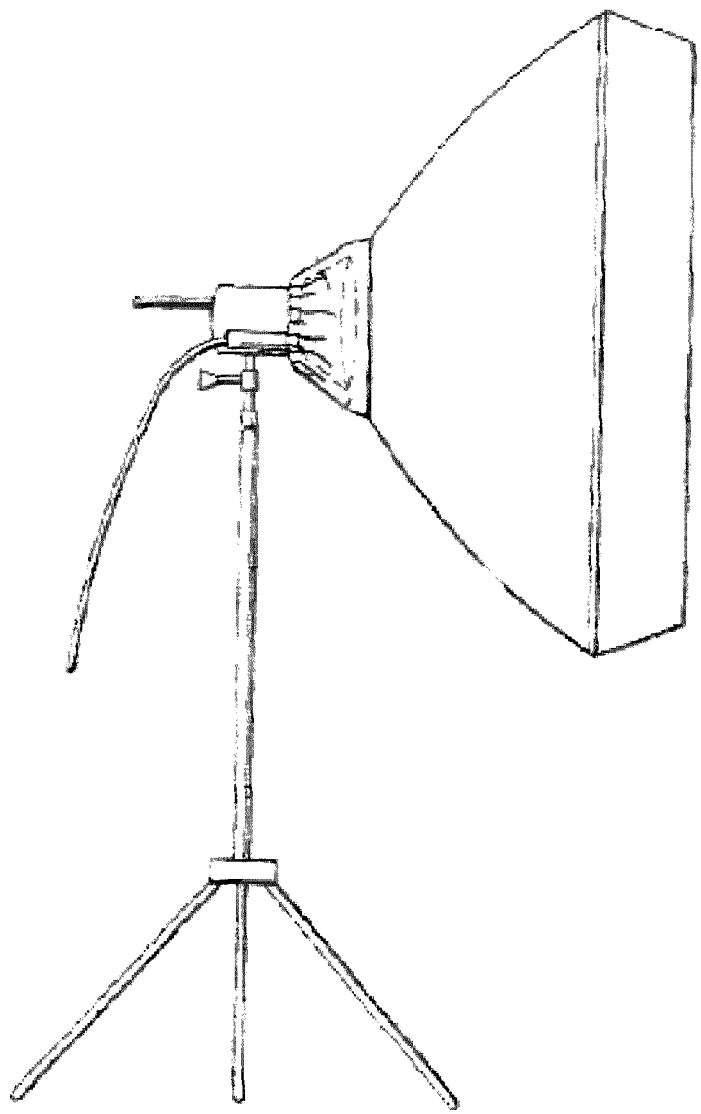
FIG. 6 depicts a traditional softbox.

FIG. 5a and FIG. 5b illustrate an alternate light fixture configuration, according to an example embodiment of the invention. In this example embodiment, the softbox may be configured to operate with four, four foot T-12 fluorescent lamps (510), and a remote ballast system. In an example embodiment, the enclosure (500) may be lined with reflecting material (508). In an example embodiment, the lamps (510) may be secured to the back panel of enclosure shell (503) with lamp clips (518). According to an example embodiment, each end of the lamps (510) may be connected to the remote ballast wiring harness (not shown) by lamp connectors (514). According to an example embodiment, a wiring harness may pass through wire holes (520). According to an example embodiment the cooling fans (506) may be mounted to the enclosure behind fan holes (509), powered by fan power supply (507), and controlled through multiple speed fan switch (511). In an example embodiment, the fan power supply (507) may have its voltage supplied from the lamp voltage via a lamp connector for fan power (512). According to an example embodiment, air may be is drawn into (or expelled out of) the enclosure through vent holes (502). In an example embodiment, a frame structure (516) may attach to the enclosure main flange (501) and mounting flanges (522), and may secured by four screws passing through the frame structure end panels (517) into the mounting flanges (522). According to an example embodiment, the enclosure (500) may include mounting plate holes (504) through which pins from a mounting mechanism attach, and the mounting mechanism may allow the light fixture to be attached to a variety of stands, adapters etc.

With the continual progress being made on LED design and manufacture, LED's have become a viable option for a light source for some studio light fixtures. They have many advantages over other light sources, such as their extremely large ratio of light output to size, long life, lower heat, lower power requirements, lower weight, stable color temperature and color balance, the ability to electronically adjust the color temperature of the light output etc. Their use is currently not economically viable for larger, higher power studio fixtures, but as their development progresses, light output will continue to rise and costs will continue to fall, and their use will soon become widespread, and may become the industry standard light source. The design principals of the softboxes in this disclosure would be well served by the use of LED's as a light source. With advantageous placement and spacing of LED lamps on the back reflecting panel of the enclosure, a light fixture profile thickness on the order of ½" should be attainable. Liquid cooling or passive heat sinks can be incorporated to reduce the use of fans which create size and noise issues. It is therefore an intention of this applicant that light fixture of this disclosure be deemed to be configurable for use with all manners of LED's as a light source.

As shown by the details disclosed herein, the light fixture according to example embodiments of the invention may have at least the following advantages over traditional softboxes:

a) An extremely diffused light source with a highly uniform output illumination on the output panel, which may exceed that of a typical traditional softbox of equivalent size;

b) Light output levels perhaps as high as 200% higher compared to that of a traditional softbox with assumptions as previously described;

c) A very thin profile. A traditional softbox with an equivalently sized output surface could have a depth of approximately 15" to achieve the required diffusion, as compared to approximately 3";

d) With optional top prism film, a total FWHM viewing angle of about 52 degrees in both the vertical and horizontal planes and without loss of light output levels may be achieved, and without bulky, inefficient and inconvenient grids or louvers;

e) Incorporation of all of the above advantages with the ability to utilize linear fluorescent tubes;

f) Incorporation of all of the above advantages while maintaining an operating temperature with minimal change in the color temperature or color balance of fluorescent lamps, and which may serve to increase the lamp life expectancy; and g) Incorporation of a mounting system for addition light modification films which makes it easier and less time consuming to install.

As shown by the details disclosed herein, the example embodiments of the invention may have at least the following advantages over typical studio soft lights;

a) An extremely diffused light source with a highly uniform output illumination on the output panel which may exceed that of a studio light fixtures with diffusive material attached thereto;

b) Light output levels perhaps as high as 350% higher compared to that of a studio soft lights with a comparable configuration as previously described;

c) With optional top prism film, the light fixtures may exhibit the advantages of a) and b) as well as a total FWHM illumination angle of about 52 degrees in both the vertical and horizontal planes without bulky, grids or louvers and their associated light output losses;

d) Incorporation of all of the above mentioned advantages with perhaps a thinner in profile;

e) Incorporation of all of the above mentioned advantages while maintaining an operating temperature that causes the light source to exhibit minimal color temperature or color balance change, and which may increase the lamp life expectancy;

f) Incorporation of all of the above mentioned advantages and can be quickly be converted to a soft light with a wide dispersion pattern suitable as a fill light by removal of the frame structure; and g) Incorporation of a mounting system for additional light modification films which may make it easier and less time consuming to install said films, may have a lower profile, may be substantially lighter, may have a substantially smaller gap between said films and the front face of the light fixture, can be an "off the shelf" item which does not require custom fabrication, and may use less installation labor.

In accordance with examples of the invention, another embodiment is presented. For the sake of brevity, in this example embodiment, only details that are unique to this example embodiment will be discussed here. Elements, principals, materials or details in this example embodiment that are similar to or correspond to elements, principals, material or details elsewhere in other example embodiments of the invention may not be repeated, and should be deemed to be hereby included in this embodiment.

In an example embodiment, a retrofit lighting apparatus is provided for attaching to various Kino Flo™ light fixture models (herein referred to as "Kino fixtures") which have "open" type designs. Such models may include, but are not limited to, 4Bank Single, 4Bank Double, Mega 4Bank, Mega Double 4Bank, Mega Single, Foto-Flo, and Diva-Lite models. In example embodiments of the invention, the retrofit lighting apparatus can also be used as a standalone light fixture independently of the Kino fixture. Each of the models of Kino Flo fixtures mentioned above may have some differences such as lamp configuration, dimensions, ballast, wiring etc, but the basic design concept may remain the same for all of them.

Figure 7:
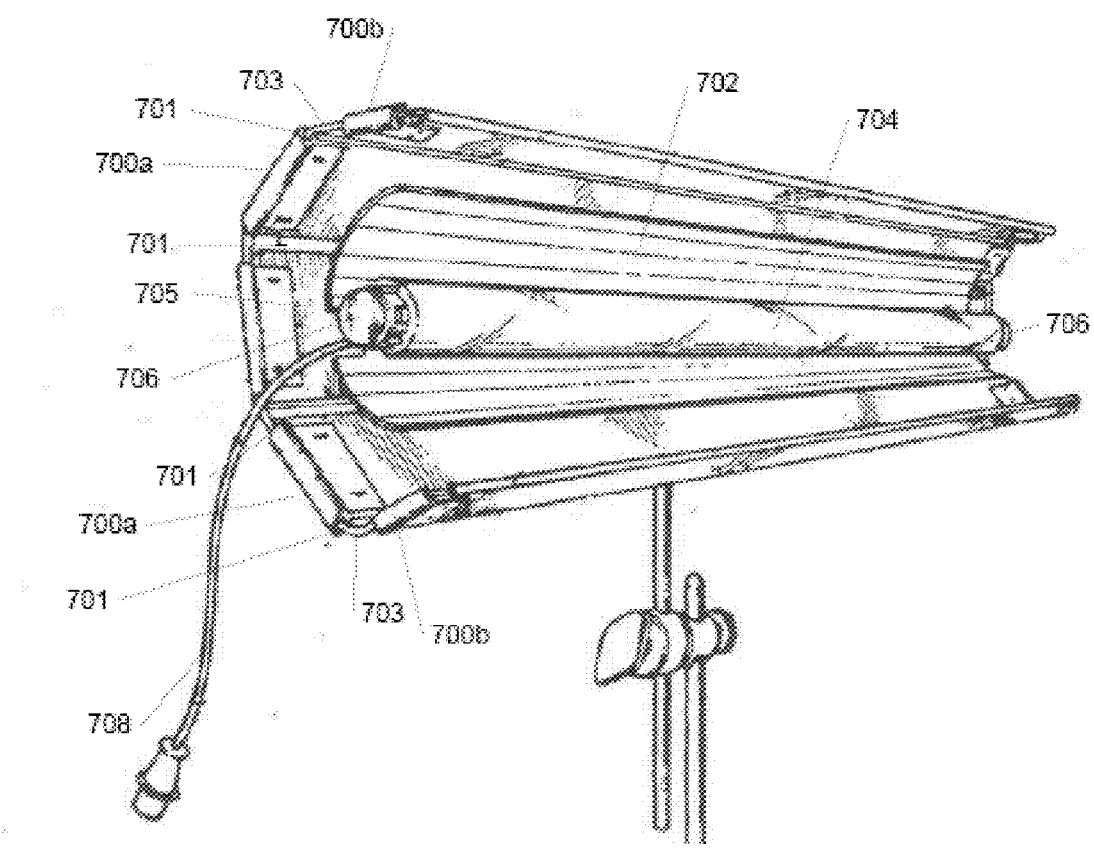
FIG. 7 depicts a Kino Flo™ studio lighting fixture.

According to certain example embodiments of the invention, the Kino fixtures may utilize a remote ballast system, where the lamp power may be supplied from an electronic ballast unit that is separate from the fixture, and may be connected via a multi-cable arrangement. FIG. 7 illustrates an example Kino Flo Single model, which may utilize a 4 foot linear fluorescent lamp. The frame of the fixture may be constructed from a continuous piece corrugated plastic with gaps (701) in the corrugation layer that may act as hinges that allow the sections (700a and 700b) to bend. Attached at each end of the fixture is an articulating cable (703), which may keep the sections in place once they are manipulated. The flat center part of the inside of the frame (705) may have two metal strips which contain the lamp clips (See FIG. 10, 1005), and there is a single continuous reflector (702) that attaches to the frame with Velcro™. The lamps may be installed with the lamp clips above the reflector.

Another feature of these fixtures is that the individual lamps are connected by special quick release connectors (706) attached to flexible lamp cord (708). The lamp cords may be typically exposed for a portion of their total length before they are enclosed in a multi-cable casing. The two movable sections (700a and 700b) disposed on either side of the center section (705) may be manipulated to control to a degree, light spilling from the sides of the fixture. The movable sections 700a and 700b may be further manipulated to form a square profile, which helps to protect the interior of the fixture when transporting. Additionally, a honeycomb grid sometimes referred to as an "egg crate" can be attached with hook and loop fasteners over top of the lamps which may provide a degree of light collimation. Typically, light modifying gels, including diffusers, may be taped or clipped to the edges of the movable section disposed furthest away from the center section.

These fixtures have enjoyed a large degree of commercial success, and still have applications for which they are well suited. However, such Kino Flo fixtures may suffer from a number of limitations when used as a soft light fixture, including:

a) typically, a diffusion film or fabric diffuser will be clipped or taped to the edges of the movable section (700b) furthest from the center section, and spread open to a degree, similar to that shown in FIG. 7. The rear reflector is typically a highly specular reflector and partially collimates the light. The diffusion material is placed in close proximity to said partially collimated light. The result is a relatively low uniformity of illumination across the diffusion material. The back scatter of light reflecting backwards from the rear of the diffusion material (which is a normal occurrence) for the most part may not get recycled, and may be lost either through the sides of the fixture which are completely open, or absorbed by the black plastic of the frame. This may result in a relatively large degree of lost light output;

b) the practice of taping or clipping light modifying films or "gels" such as diffusion material, colored gels, color correcting gels etc. may be cumbersome and inefficient; and c) the light spill from the open sides of the fixture is pronounced, which may substantially decrease the output efficiency of the fixture, and in some applications this light may need to be controlled, which may require some kind of light blocking material be affixed to the fixture, which may take time and effort, and may result in extra cost to the production.

Such limitations may be addressed by an example embodiment of the invention that may be attached to a Kino fixture, or may retrofit similar fixtures.

Figure 10A:
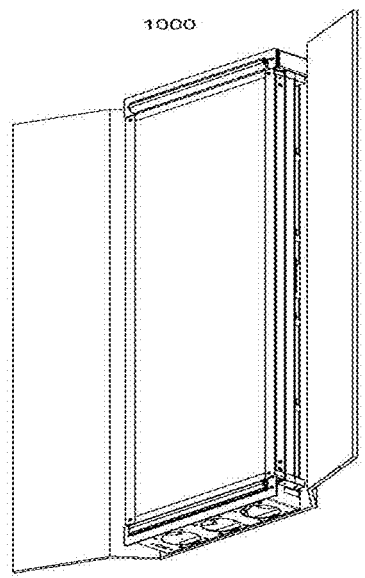
FIG. 10 depicts an exploded perspective view of an example light fixture and an example Kino Flo™ light fixture according to an example embodiment of the invention.
Figure 10B:
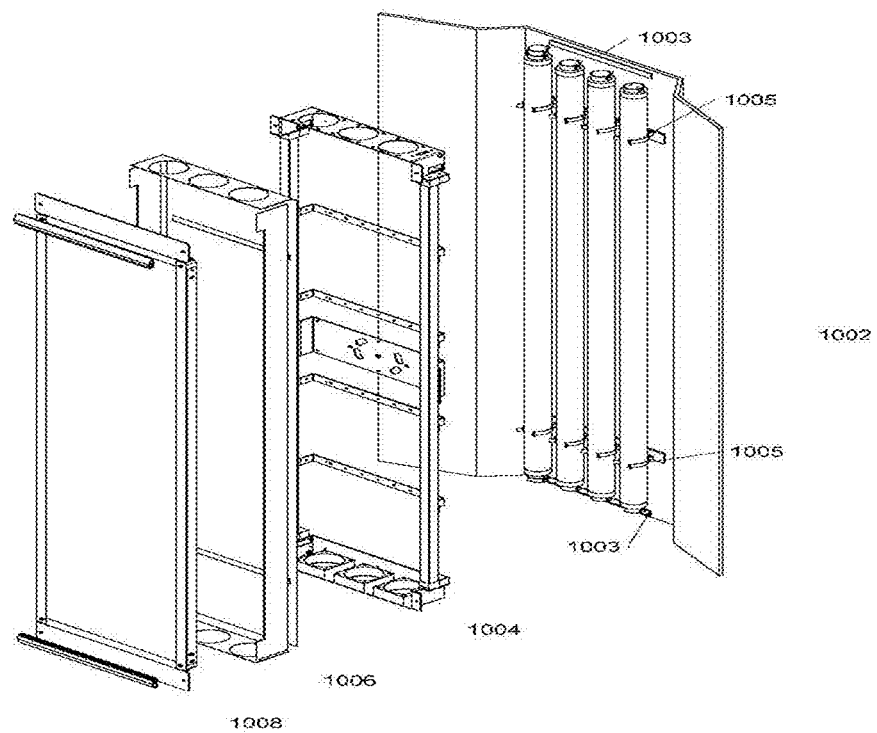

Referring now to FIG. 10a, a depiction of an example embodiment of retrofit lighting apparatus attached to a simplified Kino Flo™ 4 bank light fixture is shown. For the purpose of explanation, the depiction shown in FIGS. 10a and 10b do not include wiring and other details for simplicity. Referring now to FIG. 10b, in an example embodiment of the invention, the retrofit lighting apparatus may be formed by the main assembly (1004) with reflector lining (1006), and frame structure (1008). The retrofit lighting apparatus may be configured to nest into the Kino Fixture (1002). In certain example embodiments, the lamps on Kino fixture may be removed, the frame structure (1008) may be removed from the softbox, the main assembly (1004) may attach to the central portion of the Kino fixture (1002) with Velcro™ strips (1003) and the corresponding mating Velcro™ surface on the underside of the main assembly (1004) (not shown). In accordance with an example embodiment, lamp clips may protrude through slots in the reflector lining (1006). The lamps can then be mounted on the lamp clips (1005), the wiring can be connected to the lamps, and the frame structure can be subsequently attached to the main assembly (1004).

FIG. 10b depicts an example structure of the main assembly. This example embodiment represents a light weight configuration of the main assembly (1004), and is not meant to limit the range of possible alternate structural configurations. For example, a one piece sheet metal (or other suitable material) enclosure similar to that shown in FIG. 5b (500) with appropriate modifications, may serve to replace many elements of the said main assembly (1004).

Figure 11:
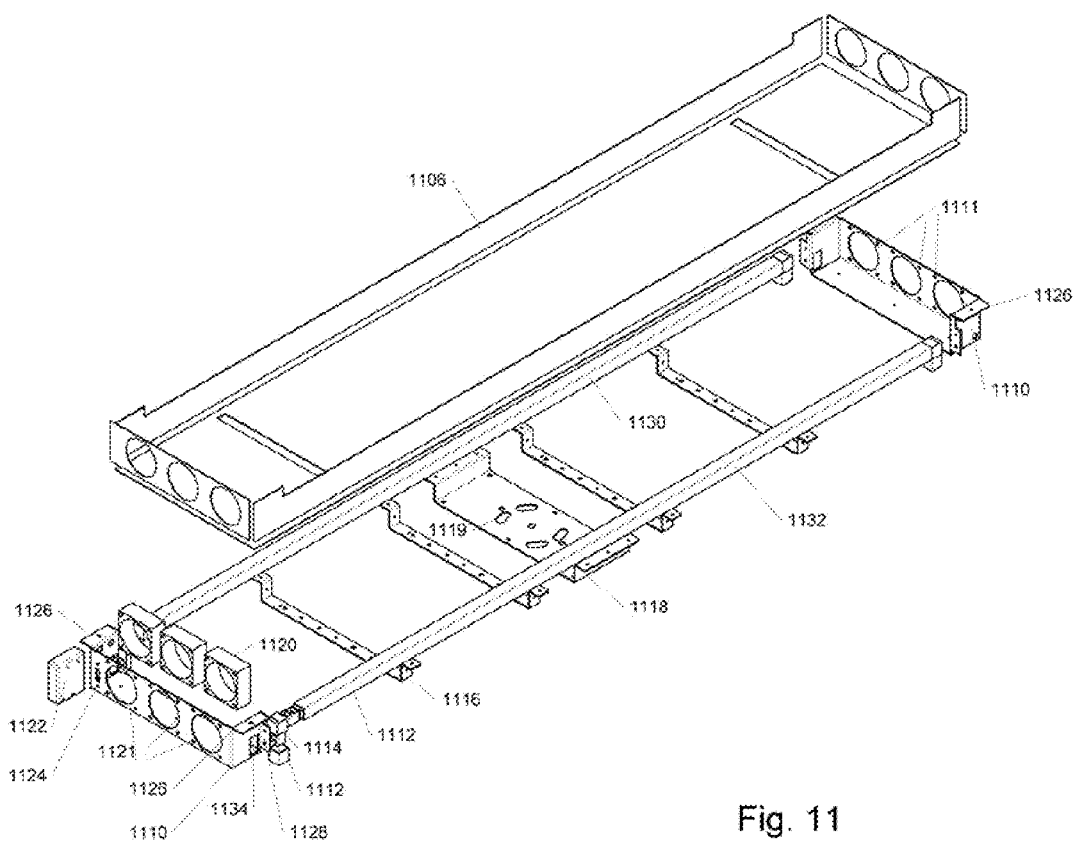
FIG. 11 depicts an exploded perspective view of the example light fixture shown in FIG. 10 without the example Kino Flo™ light fixture.

Referring now to FIG. 11, according to example embodiments of the invention, end panels (1010) may be disposed at each end of the main assembly (1104). They may be fabricated from aluminum sheet metal. As a manufacturing cost saving feature, both end panels (1110) may be the same, but they can be configured differently as well, such as the ventilation holes on the opposite end panel from of the fans can be one continuous opening, to allow for more airflow with less turbulence. In an example embodiment, fans (1120) may be mounted on the inner surface of one of the end panels (1110) directly behind fan holes (1121), and can be wired to either exhaust the interior heated air, or force cooler outside air through the softbox. According to an example embodiment, wire access holes (1134) may enable the cables and connectors from the ballast wiring harness to access the softbox and connect to the lamps.

According to an example embodiment, the end panels (1110) may be joined together by identical left and right frame assemblies, each of which may be defined by a horizontal frame member (1112) with 90 degree connectors (1114) attached at each end, and vertical frame members (1*v*13) attached to the other end of each connector (1114). In example embodiments, frame members may be square aluminum tubing with a ¾" outside diameter and a thin wall such as 0.05" to save weight. Other sizes and materials may be used. In example embodiments, ¾" aluminum tubing may be used. Such tubing may have the advantage of being rigid enough for the intended application, and may be supplied with black anodized finish (which may save on painting costs), it is a standard size, and several companies manufacture compatible, inexpensive slide in joining connectors. According to an example embodiment, a connector (1114) can be one of the joining connectors, which can be fabricated from fiberglass infused nylon material, which may be very strong, and may use a friction fit inside the tubing, and thus may not require screws, which may save on assembly costs. In an example embodiment, a connector (1114) may join a horizontal frame member (1112) and vertical frame member (1113). Two self tapping screws through the holes on mounting flanges (1128) on end panels (1110) may screw into the connector (1114) and vertical frame member (1113) on both ends of the left frame (1130) and right frame (1132).

According to an example embodiment, brackets (1116) may be mounted on the underside of the left frame (1130) and right frame (1132) with self-tapping screws and may be positioned similarly to that shown in FIG. 11. According to an example embodiment, the brackets (1116) may increase the rigidity and strength of the main assembly (1104) and serve as a support base for the rear panel of the reflector lining (1*v*06). In an example embodiment, mounting bracket (1118) may also provide rigidity and strength of the main assembly (1104) and serve as a support base functions, and may also serves as a mounting base when the light fixture is used as a standalone fixture. In an example embodiment, mounting pins on a compatible Kino Flo™ mount may be attached to receiving holes (1119) on mounting bracket (1118).

According to an example embodiment, the reflector lining (1106) may serve as a reflecting surface for the side and rear panels of the enclosure and may be fabricated from individually cut pieces of reflection material that are adhered to the corresponding inside sections of the main assembly (1104) with a suitable adhesive. Optionally, the reflector lining (1106) can be one continuous piece folded piece and cut at the corner seams. In an example embodiment, the reflector lining (1106) may include holes and slots cut as necessary to accommodate fans, ventilation holes, and slots for the bulb clips on the Kino fixture.

In accordance with example embodiments of the invention, the end panels of the frame structure shown in FIG. 10b (1008) may mate to the top surfaces of the mounting flanges (1126), and may be secured by one or more screws per flange. In an example embodiment, the frame members on the frame structure may align to the top surface of the horizontal frame members (1112). According to an example embodiment, the assembled retrofit lighting apparatus may have an approximate depth of 2.6" and may nest inside the Kino fixture such that the movable sections of the plastic base can be fully closed.

In accordance with certain examples of the invention, the cooling fans may be powered by tapping electrical power from the lamp supply. According to an example embodiment, electrical connections may be made to the lamp electrodes. According to an example embodiment, the alternating current power supplied to the lamps may be "siphoned" off, rectified, and voltage regulated to provide power for the fans.

Figure 13:
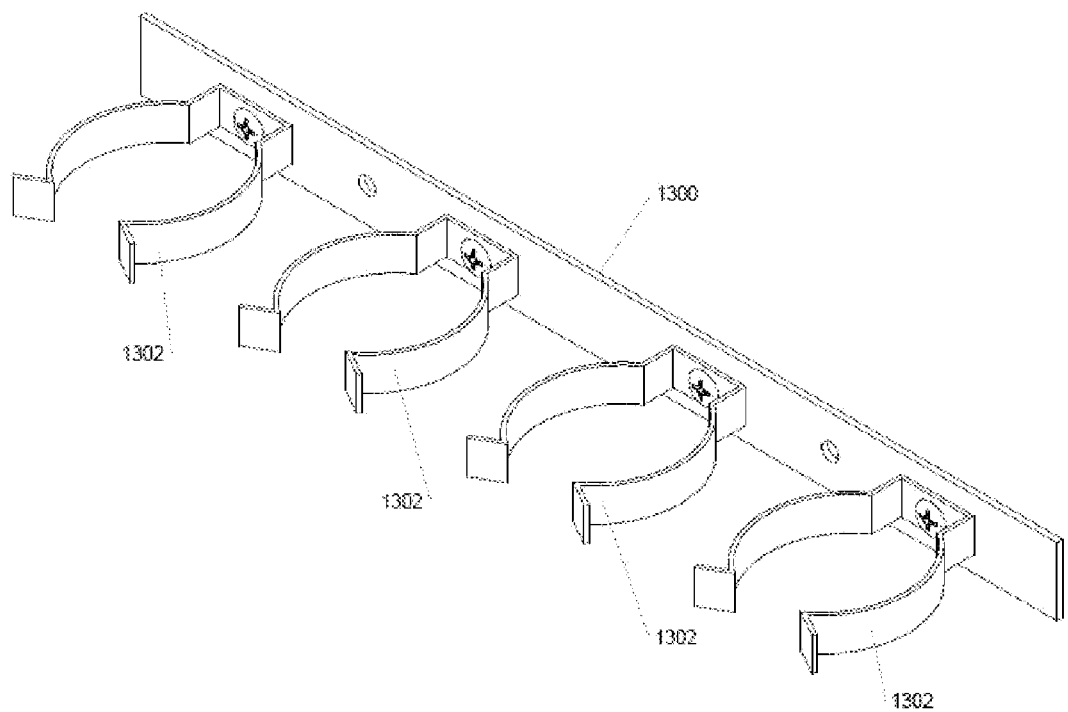
FIG. 13 depicts a lamp clip tray according to an example embodiment of the invention

According to certain example embodiments, the retrofit lighting apparatus can also be used independently of the Kino fixture. FIG. 13 shows an example bulb clip tray, which may include lamp clips (1302) attached to a base. Two of these assemblies may attach directly on top of the two brackets (FIG. 11, 1116) disposed closest to the end panels (FIG. 11, 1110) with two screws for each assembly. When the wiring harness is connected in the same manner as it would normally be connected, and the bulb clip trays are installed, the retrofit lighting apparatus can be used on its own, independently of the Kino fixture.

In example embodiments of the invention, an alternative ventilation system may be utilized. For example, in embodiments similar to those depicted in FIG. 11, long linear fluorescent lamps may be utilized (4 foot lamps, for example) and there may be certain advantages to a ventilation system in which fans are placed on opposing ends of the enclosure to draw ventilation air into the enclosure. For example, in certain embodiments, ventilation air travels from the intake end of the fixture to the exhaust end of the fixture, and the section of the lamps near the exhaust end may exhibit a higher temperature than the section of lamps near the intake end, resulting in a greater color temperature or color shift near the exhaust end of the fixture. Referring to FIG. 11, an alternate ventilation configuration of the example embodiment may be provided which reconfigures the fan and ventilation holes, such that one or more fans are mounted on each end panel (1110) and may be positioned and configured such that they force air into the light fixture. In an example embodiment, the ventilation holes (1111) in the end panels (1110) may be eliminated and a ventilation opening may be provided along the side of the light fixture, for example, along the top side when the light fixture is mounted horizontally. According to example embodiments, the ventilation opening may be a strip opening of suitable length and wide enough to provide adequate ventilation. An example of an adequate ventilation hole would be an opening about 46" long and ¾" wide. This example configuration may provide more uniform temperature regulation over the length of the lamps.

According to example embodiments of the invention, the retrofit lighting apparatus described in this second embodiment may be used with a Kino Flo 4 Bank light fixture, and is intended to serve as an example embodiment. The principals and designs depicted in the figures and embodiment descriptions may be applied to any or all of the listed Kino Flo models as well as any other Kino Flo fixture not listed, but which share similar or compatible design characteristics.

As shown by the details disclosed herein, the an example embodiment of retrofit lighting apparatus may be attached to a Kino fixture and may provide at least the following attributes:

a) an extremely diffused light source with a highly uniform output illumination on the output panel exceeding that of Kino fixtures with diffusive material attached thereto;

b) light output levels of perhaps up to approximately 350% higher compared to that of Kino fixtures with comparable diffusion and collimation configurations as previously described;

c) if the optional top prism film is used, the advantages of a) and b) as well as a FWHM viewing angle of about 52 degrees in both the vertical and horizontal planes, and without the use of inefficient louvers or grids etc.

d) all of the above mentioned advantages and can be quickly be converted to a soft light with a wide dispersion pattern suitable as a fill light by the removal of the frame structure; and e) a secure mounting system for additional light modification films which may fully cover the retrofit lighting apparatus face with a negligible gap.

According to example embodiments of the invention, the light fixture may include two or more film tensioners that are configured to engage two or more optical films such that the two or more optical films are substantially flat and substantially without a gap therein between.

According to example embodiments of the invention, the two or more film tensioners may be configured to engage the at least one optical film such that the at least one optical film completely covers the optical aperture and touches a continuous periphery defined by the frame structure such that the one or more optical film surfaces are continuous within the optical aperture.

According to example embodiments, the film tensioners are adjustable.

According to an example embodiment, the two or more adjustable film tensioners are configured to engage the at least one optical film in two or more corners of the frame structure.

According to example embodiments of the invention, the light fixture may include at least one light source of the following type: fluorescent, light emitting diode, incandescent, electroluminescent, or chemiluminescent.

According to an example embodiment, the light fixture may include least one optical film that may include a diffusion surface or diffusion film. According to an example embodiment, the light fixture may include a reflective inner surface that is configured to reflect about 70% to about 100% of incident light, and the incident light may be reflected in a diffuse lambertian reflectance distribution pattern. According to example embodiments of the invention, the light fixture may include one or more cooling fans configured to promote air cooling of the at least one light source and the enclosure cavity.

According to example embodiments of the invention, the light fixture may include at least one lenticular lens surface configured for condensing or focusing at least a portion of the light generated by the light source or light reflected from the one or more reflective inner surfaces. According to example embodiments of the invention, the light fixture may include at least one optical film that is secured to the frame structure or film tensioners with four or more clamping devices. According to example embodiments of the invention, the light fixture may include a frame structure that is removable from the light fixture. According to example embodiments of the invention, the light fixture may include at least one lenticular lens surface that comprises a first lenticular lens surface and a second lenticular lens surface disposed therein, such that an axis of alignment of the second lenticular lens is perpendicular to an axis of alignment of the first lenticular lens surface. In accordance with an example embodiment, the lenticular lens surface includes triangular prisms.

Accordingly, example embodiments of the invention can provide the technical effects of creating certain systems, and apparatus that provide a lightweight, efficient, and compact lighting fixture.

Example embodiments of the invention can provide the technical effects of creating certain systems, and apparatus that provide a light fixture or softbox having a profile that is thinner than traditional fixtures.

Example embodiments of the invention can provide the technical effects of creating certain systems, and apparatus that provide a light fixture or softbox having efficient light output levels.

Example embodiments of the invention can provide the technical effects of creating certain systems, and apparatus that provide a light fixture or softbox fixtures having a controlled output distribution pattern without the use of grids or louvers.

Example embodiments of the invention can provide the technical effects of creating certain systems, and apparatus that provide a light fixture or softbox that may use linear fluorescent tubes or light emitting diodes as the light source.

Example embodiments of the invention can provide the technical effects of creating certain systems, and apparatus that provide a light fixture or softbox for maintaining an operating temperature in which color temperature and/or color balance is relatively maintained and bulb life expectancy is extended.

Example embodiments of the invention can provide the technical effects of creating certain systems, and apparatus that provide a light fixture or softbox that may be quickly be converted to a soft light with a wide dispersion pattern suitable as a fill light.

In example embodiments of the invention, the light fixture, softbox, film tensioner, and retrofit system discussed herein may include any number of hardware modifications to facilitate any of the operations.

While the invention has been described in various embodiments in connection with what is presently considered to be the most practical, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A light fixture configured for illuminating subjects, the light fixture comprising:
    an enclosure defining a cavity with an opening and one or more reflective inner surfaces;
    a frame structure defining an optical aperture, wherein the frame structure is disposed proximate to the opening;
    two or more film tensioners associated with the frame structure;
    at least one light source positioned between the one or more reflective inner surfaces and a plane defined by the optical aperture; and
    at least one optical film comprising a least one lenticular lens surface, wherein the at least one optical film is suspended substantially parallel to the plane defined by the optical aperture by the two or more film tensioners wherein the two or more film tensioners are configured to engage the at least one optical film in a substantially flat configuration with substantially no gap disposed between the at least one optical film and the frame structure, and wherein the at least one optical film substantially covers the optical aperture and provides a continuous periphery defined by the frame structure.

2. The light fixture of claim 1, wherein the at least one optical film comprises at least two optical films suspended by the two or more film tensioners in a substantially flat configuration with substantially no gap between the at least two optical films.

3. The light fixture of claim 1, wherein the film tensioners are adjustable.

4. The light fixture of claim 1, further comprising two or more corners in the frame structure, and wherein the two or more adjustable film tensioners engage the at least one optical film in the two or more corners.

5. The light fixture of claim 1, wherein the at least one light source comprises one or more of a fluorescent source, light emitting diode source, incandescent source, electroluminescent source, or chemiluminescent source.

6. The light fixture of claim 1, wherein the at least one optical film further comprises at least one diffusion surface or diffusion film.

7. The light fixture of claim 1, wherein the one or more reflective inner surfaces reflect about 80% to about 100% of incident light, and wherein the incident light is reflected in a substantially diffuse lambertian reflectance distribution pattern.

8. The light fixture of claim 1, wherein the light fixture further includes one or more cooling fans.

9. The light fixture of claim 1, wherein the a least one lenticular lens surface is configured for condensing or focusing at least a portion of the light generated by the light source or light reflected from the one or more reflective inner surfaces.

10. The light fixture of claim 1, wherein the at least one optical film is secured to the frame structure or film tensioners with four or more clamping devices.

11. The light fixture of claim 1, wherein the frame structure is removable from the enclosure.

12. The light fixture of claim 1, wherein the a least one lenticular lens surface comprises a first lenticular lens surface and a second lenticular lens surface disposed adjacent to one another, such that an axis of alignment of the second lenticular lens is perpendicular to an axis of alignment of the first lenticular lens surface.

13. The light fixture of claim 1, wherein the lenticular lens surface comprises triangular prisms.

14. A retrofit lighting apparatus for attaching to a light fixture and configured for modifying light from the light fixture, the retrofit lighting apparatus comprising:
    a frame structure comprising:
        an optical aperture defined by at least a portion of the frame structure;
        two or more film tensioners associated with the frame structure; and
        one or more reflective inner surfaces disposed adjacent to the frame structure; and
    at least one optical film comprising a least one lenticular lens surface, wherein the at least one optical film is suspended substantially parallel to a plane defined by the optical aperture by the two or more film tensioners wherein the two or more film tensioners are configured to engage the at least one optical film in a substantially flat configuration with substantially no gap disposed between the at least one optical film and the frame structure, and wherein the at least one optical film substantially covers the optical aperture and provides a continuous periphery defined by the frame structure.

15. The retrofit lighting apparatus of claim 14, wherein the at least one optical film comprises at least two optical films suspended by the two or more film tensioners in a substantially flat configuration with substantially no gap between the at least two optical films.

16. The retrofit lighting apparatus of claim 14, wherein the film tensioners are adjustable.

17. The retrofit lighting apparatus of claim 14, further comprising two or more corners in the frame structure, and wherein the two or more film tensioners engage the at least one optical film in the two or more corners.

18. The retrofit lighting apparatus of claim 14, wherein the at least one light source comprises one or more of a fluorescent source, light emitting diode source, incandescent source, electroluminescent source, or chemiluminescent source.

19. The retrofit lighting apparatus of claim 14, wherein the at least one optical film further comprises at least one diffusion surface or diffusion film.

20. The retrofit lighting apparatus of claim 14, wherein the one or more reflective inner surfaces reflect about 80% to about 100% of incident light, and wherein the incident light is reflected in a substantially diffuse lambertian reflectance distribution pattern.

21. The retrofit lighting apparatus of claim 14, wherein the light fixture further includes one or more cooling fans.

22. The retrofit lighting apparatus of claim 14, wherein the a least one lenticular lens surface is configured for condensing or focusing at least a portion of the light generated by the light source or light reflected from the one or more reflective inner surfaces.

23. The retrofit lighting apparatus of claim 14, wherein the at least one optical film is secured to the frame structure or film tensioners with four or more clamping devices.

24. The retrofit lighting apparatus of claim 14, wherein the frame structure is removable from the enclosure.

25. The retrofit lighting apparatus of claim 14, wherein the a least one lenticular lens surface comprises a first lenticular lens surface and a second lenticular lens surface disposed adjacent to one another, such that an axis of alignment of the second lenticular lens is perpendicular to an axis of alignment of the first lenticular lens surface.

26. The retrofit lighting apparatus of claim 14, wherein the lenticular lens surface comprises triangular prisms.

27. A frame structure comprising:
two or more corners;
an optical aperture defined by at least a portion of the frame structure;
at least one optical film; and
two or more adjustable film tensioners integrated into the frame structure wherein the two or more film tensioners are configured to engage the at least one optical film in a substantially flat configuration with substantially no gap disposed between the at least one optical film and the frame structure, and wherein the at least one optical film substantially covers the optical aperture and provides a continuous periphery defined by the frame structure.

28. The frame structure of claim 27, wherein the two or more adjustable film tensioners are integrated into the two or more corners of the frame structure and engage the at least one optical film in the two or more corners.

29. The frame structure of claim 27, further comprising two or more side frame members, wherein the two or more adjustable film tensioners are integrated into the two or more side frame members, and wherein the frame structure further comprising at least two optical films suspended by the two or more film tensioners in a substantially flat configuration with substantially no gap disposed between the at least two optical films, and wherein the two or more film tensioners are configured to engage the at least one optical film with substantially no gap disposed between the at least one optical film and the frame structure.

30. A light fixture configured for illuminating subjects, the light fixture comprising:
an enclosure cavity with an opening and one or more reflective inner surfaces;
a frame structure defining an optical aperture, wherein the frame structure is disposed proximate to the opening;
at least one light source positioned between the one or more reflective inner surfaces and a plane defined by the optical aperture; and
at least one optical film, wherein the at least one optical film is suspended or supported substantially parallel to or covering the optical aperture, wherein the two or more film tensioners are configured to engage the at least one optical film in a substantially flat configuration with substantially no gap disposed between the at least one optical film and the frame structure,
and wherein the at least one optical film substantially covers the optical aperture and provides a continuous periphery defined by the frame structure.

31. The light fixture of claim 30, wherein the at least one optical film is suspended by a transparent rigid substrate.

* * * * *